Sept. 19, 1944.    S. HINDS    2,358,771
LIQUID DISPENSING APPARATUS
Filed March 2, 1940    13 Sheets-Sheet 1
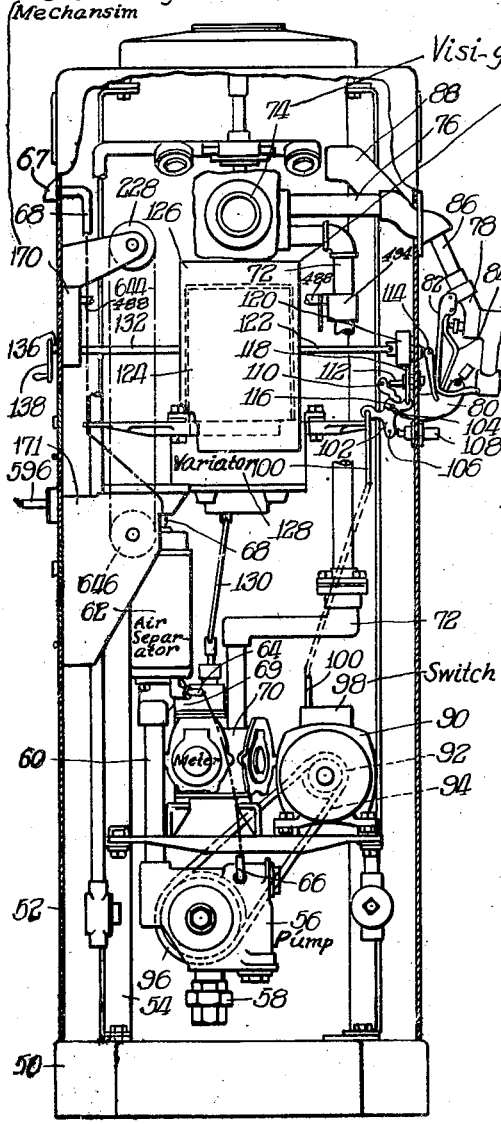
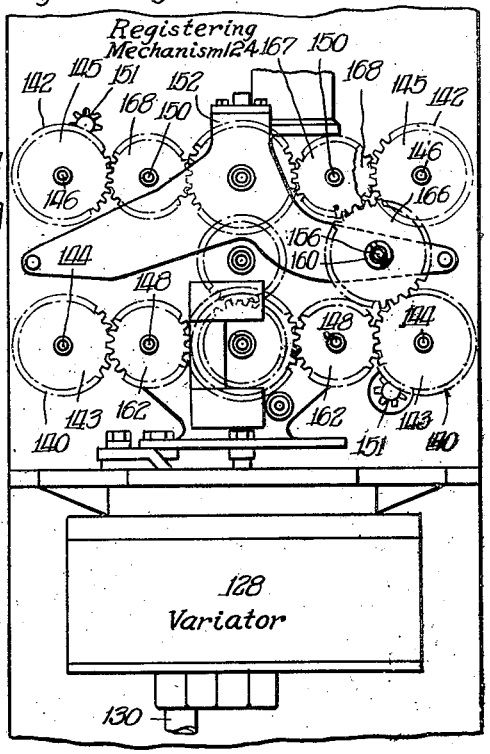
INVENTOR.
Sherwood Hinds,
BY
ATTORNEYS Sept. 19, 1944.                S. HINDS                2,358,771
                    LIQUID DISPENSING APPARATUS
                    Filed March 2, 1940      13 Sheets-Sheet 2
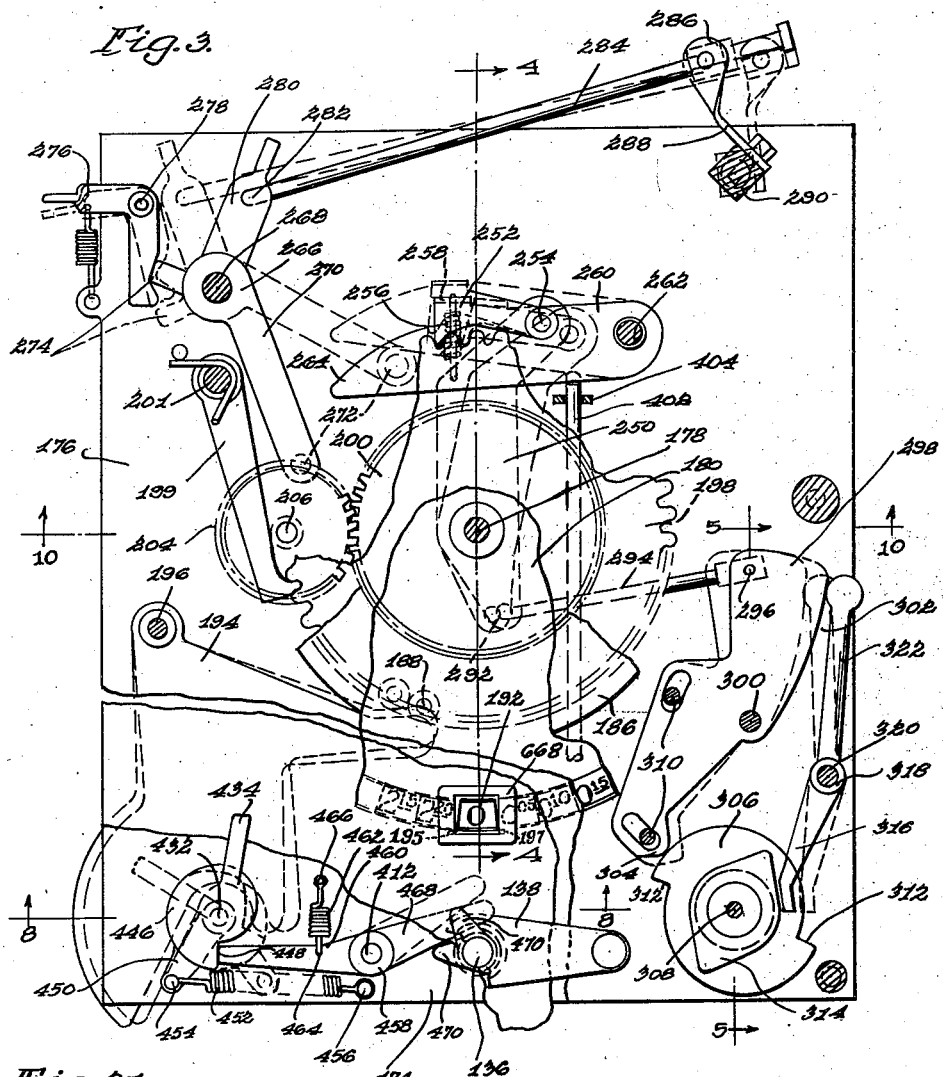
Inventor
Sherwood Hinds
By Wilkinson, Huxley, Byron & Knight
Attorneys Sept. 19, 1944. S. HINDS 2,358,771
LIQUID DISPENSING APPARATUS
Filed March 2, 1940 13 Sheets-Sheet 3
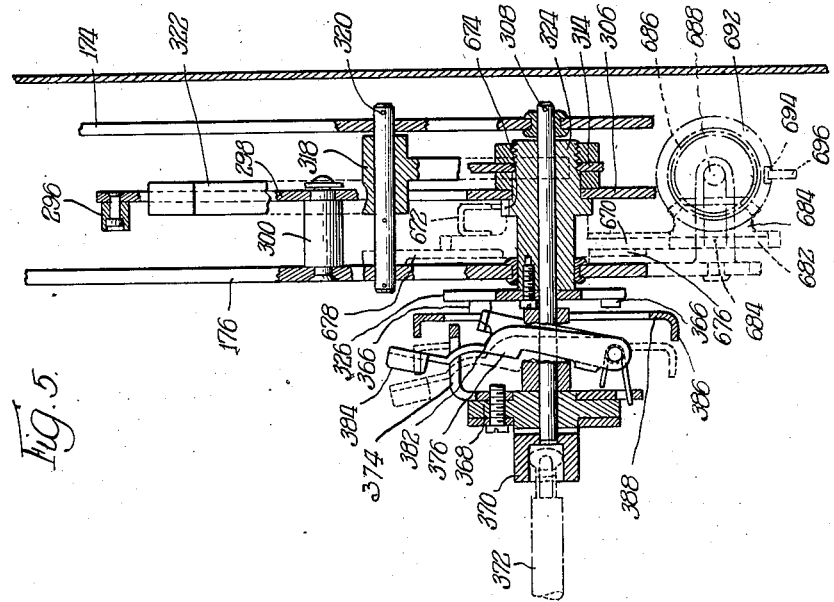
INVENTOR.
Sherwood Hinds,
BY

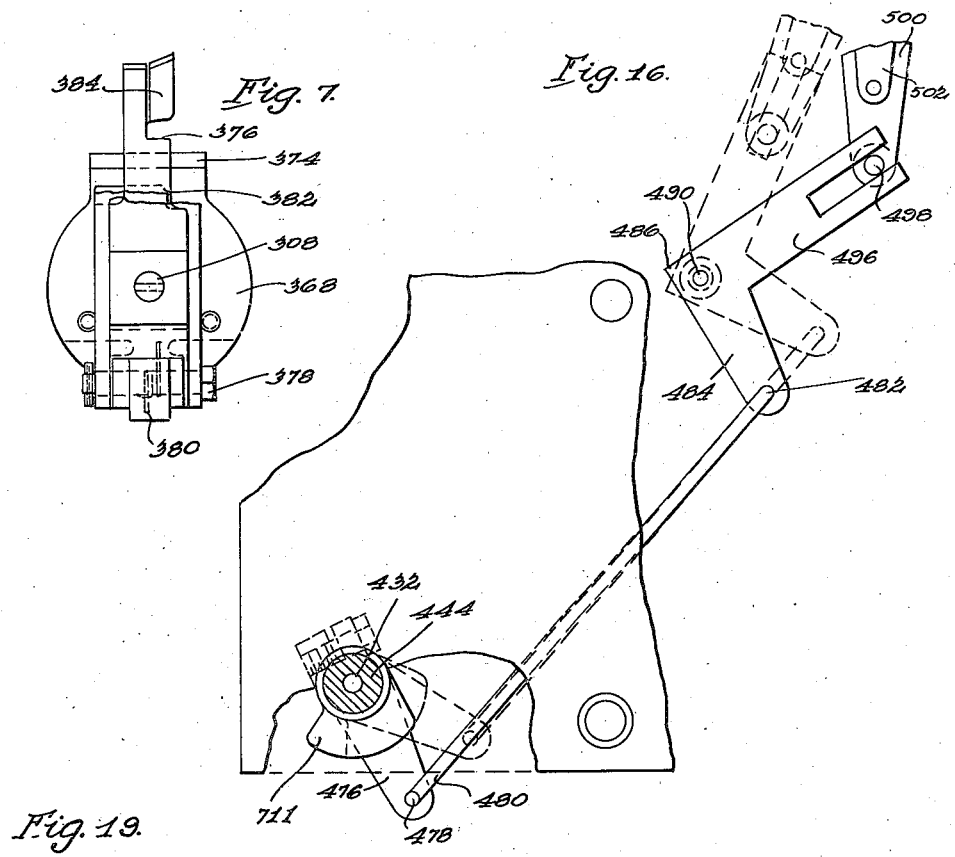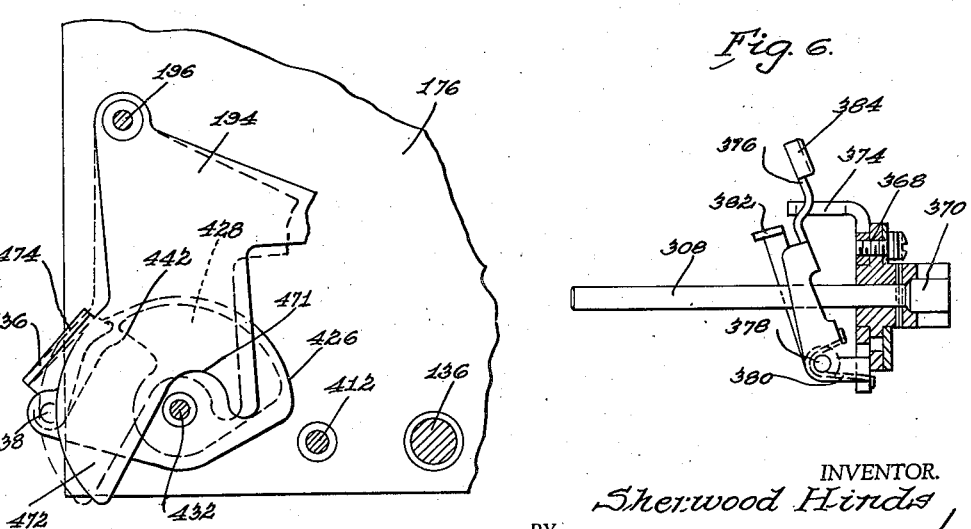

Sept. 19, 1944.  S. HINDS  2,358,771
LIQUID DISPENSING APPARATUS
Filed March 2, 1940  13 Sheets-Sheet 5

Inventor
Sherwood Hinds
By Wilkinson, Huxley, Byron & Knight
Attorneys

Sept. 19, 1944.   S. HINDS   2,358,771
LIQUID DISPENSING APPARATUS
Filed March 2, 1940   13 Sheets-Sheet 6
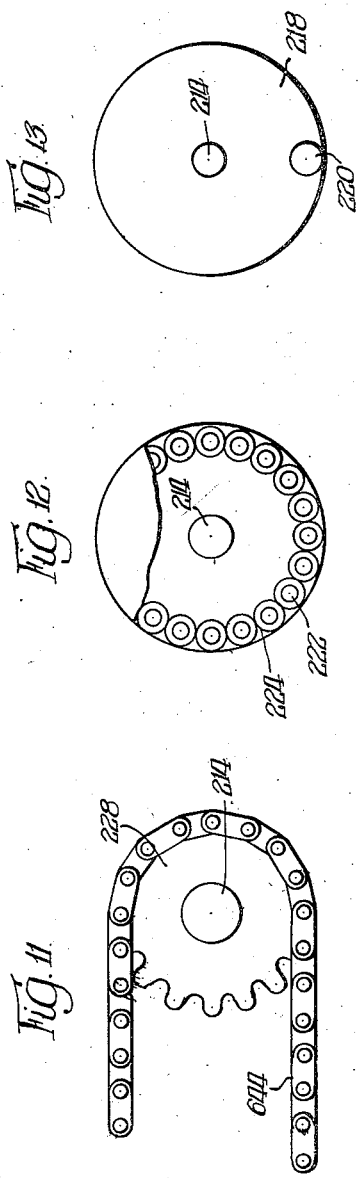
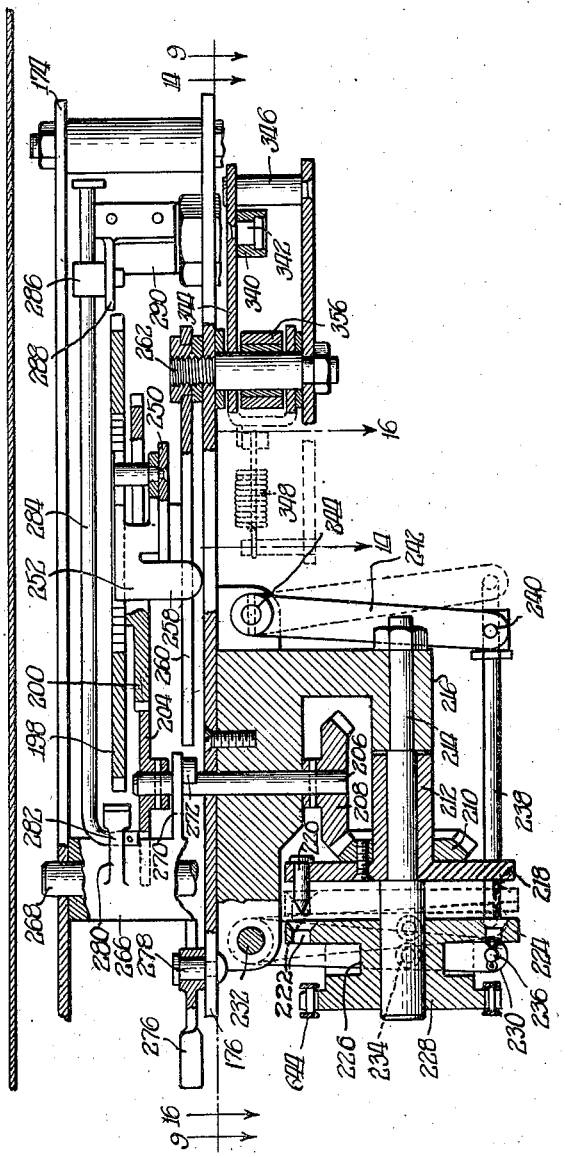
INVENTOR.
Sherwood Hinds.
BY

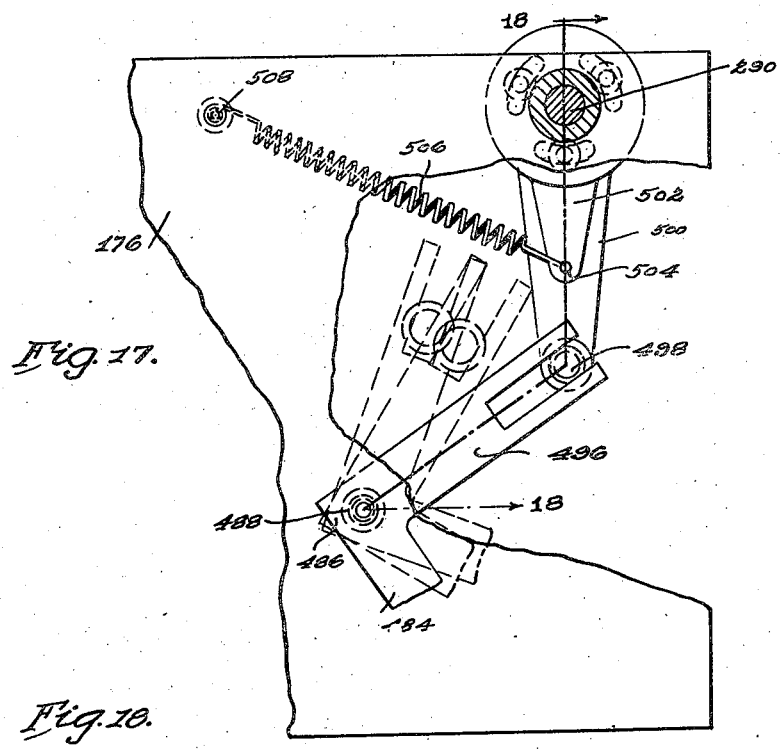
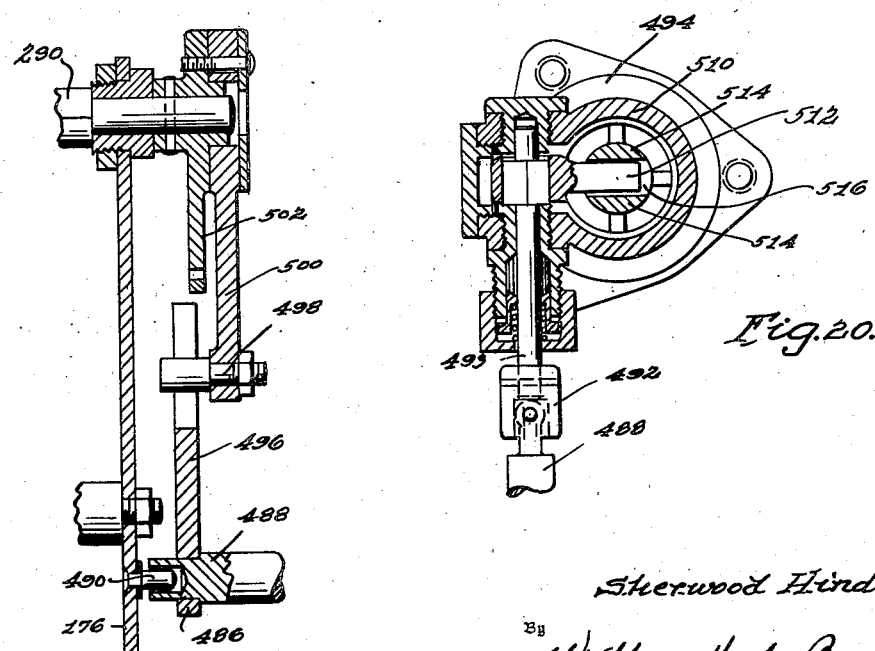

Sept. 19, 1944.　　　　S. HINDS　　　　2,358,771
LIQUID DISPENSING APPARATUS
Filed March 2, 1940　　　13 Sheets-Sheet 9

Inventor
Sherwood Hinds
By Wilkinson, Huxley, Byron & Knight
Attorneys

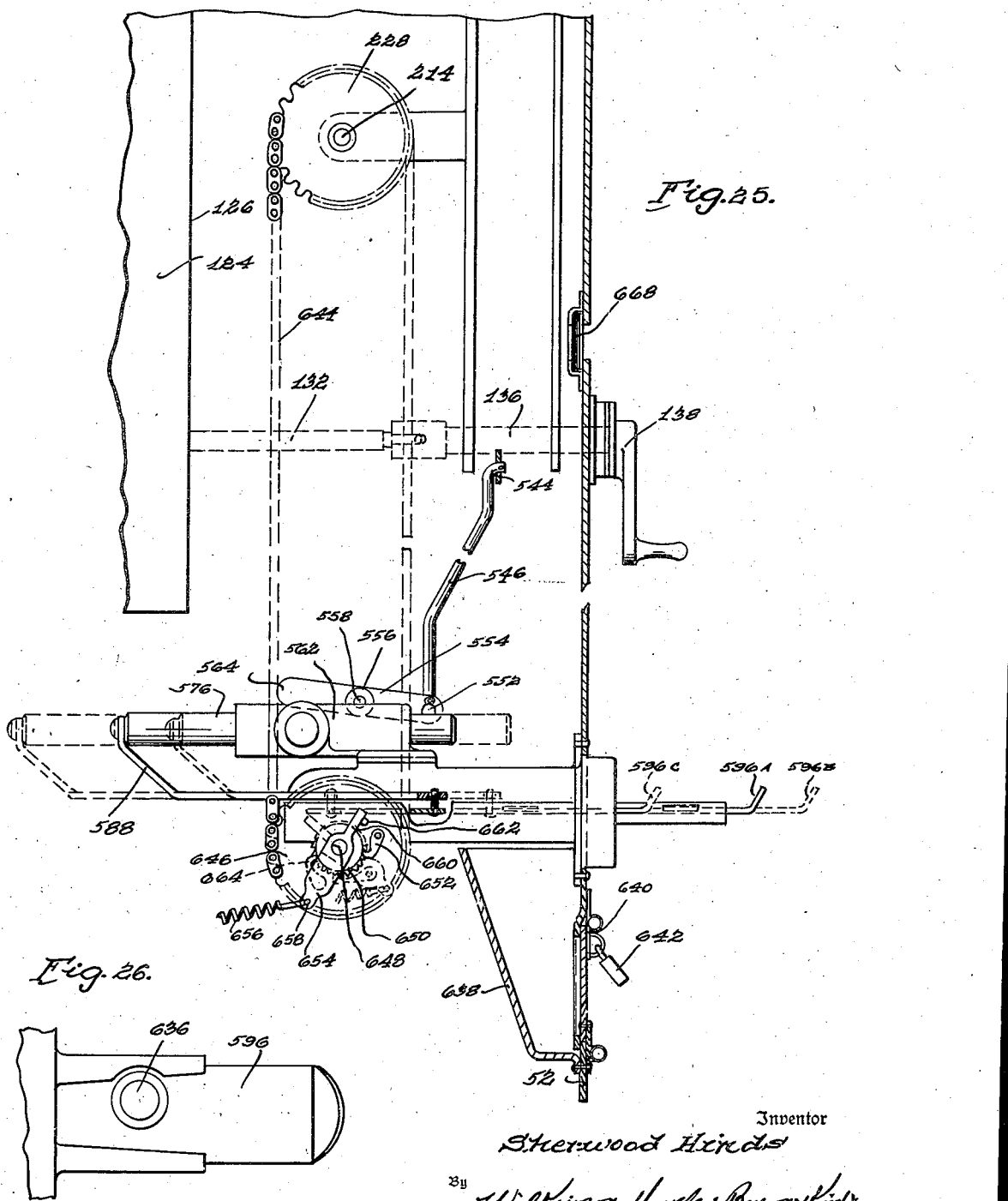

Sept. 19, 1944. S. HINDS 2,358,771
LIQUID DISPENSING APPARATUS
Filed March 2, 1940 13 Sheets-Sheet 11
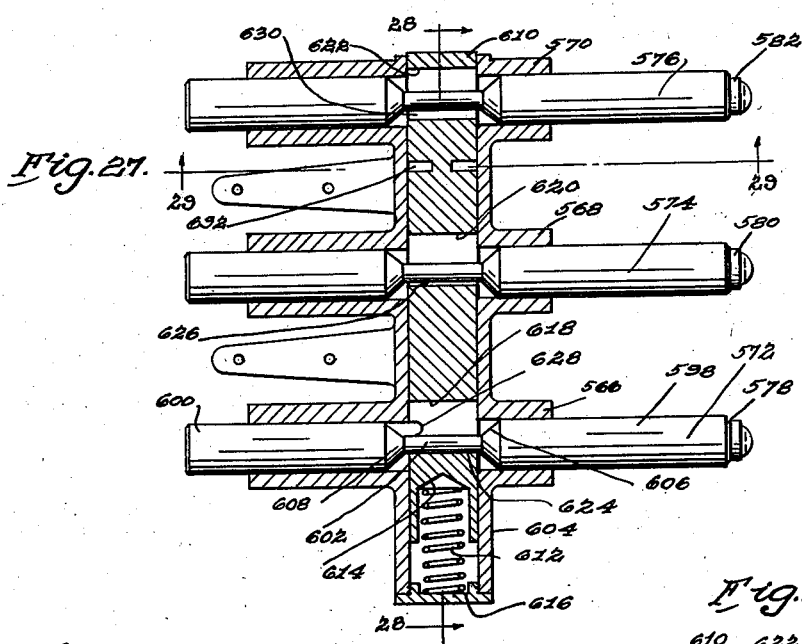
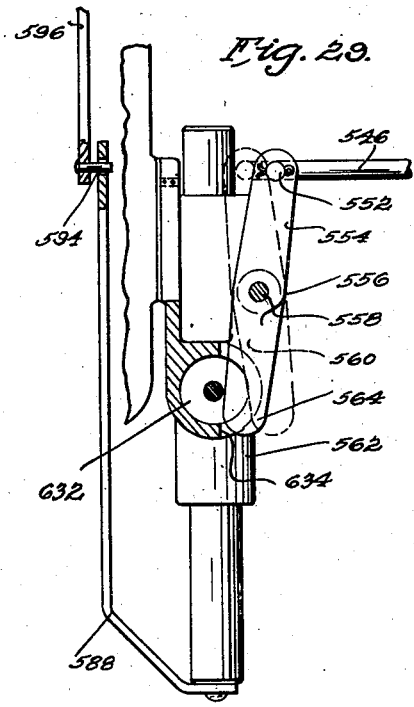
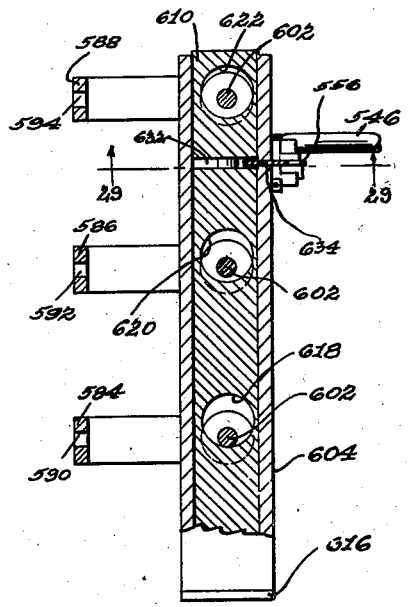
Inventor
Sherwood Hinds
By Wilkinson, Huxley, Byron & Knight
Attorneys

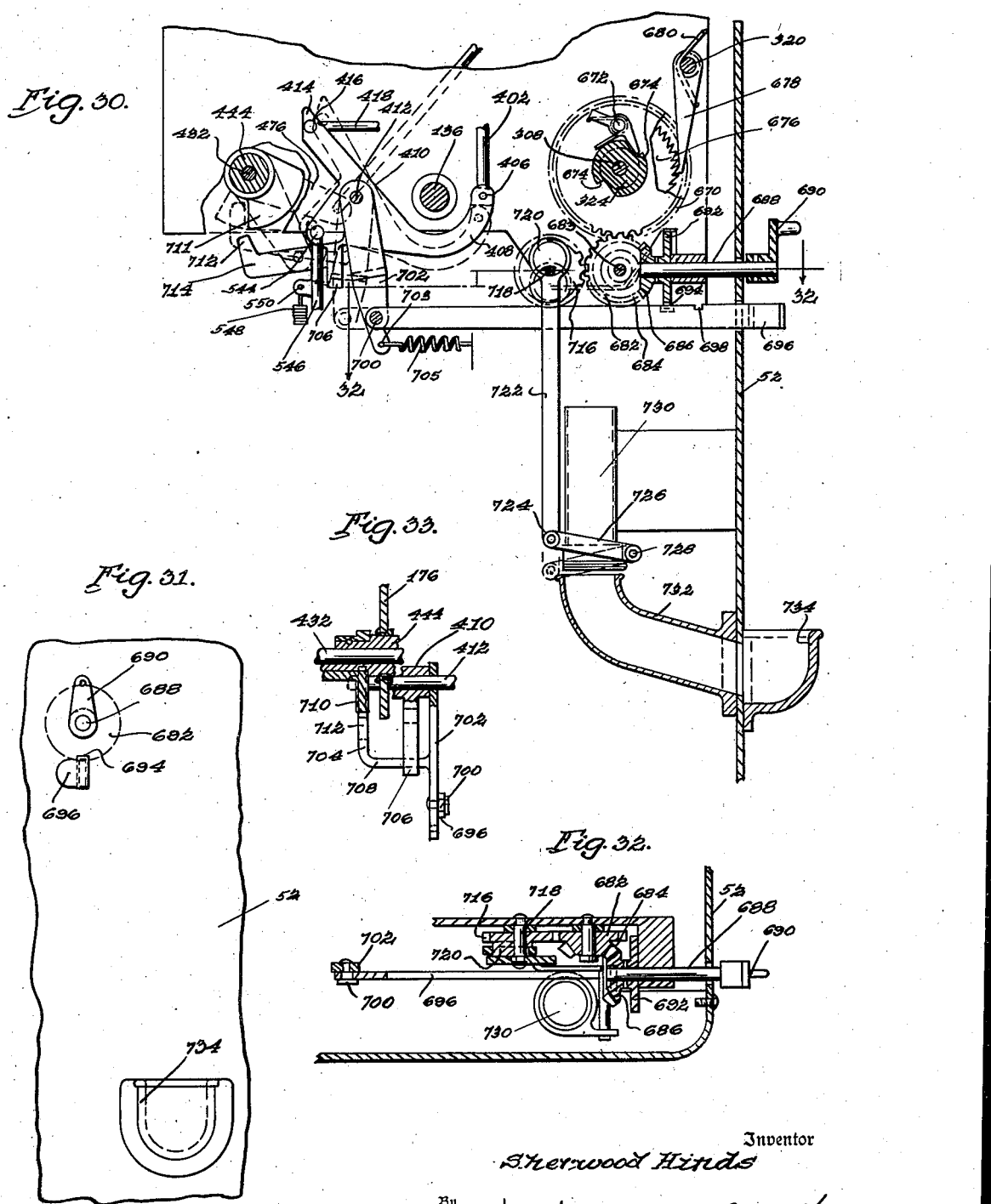

Sept. 19, 1944.  S. HINDS  2,358,771
LIQUID DISPENSING APPARATUS
Filed March 2, 1940  13 Sheets-Sheet 13

Inventor
Sherwood Hinds
By Wilkinson, Huxley, Byron & Knight
Attorneys

Patented Sept. 19, 1944

2,358,771

UNITED STATES PATENT OFFICE 2,358,771

LIQUID DISPENSING APPARATUS

Sherwood Hinds, Columbia City, Ind.

Application March 2, 1940, Serial No. 321,963

26 Claims. (Cl. 194—3)

This invention pertains to preselecting mechanism for rendering a liquid dispensing apparatus inoperative after a predetermined amount of liquid has been dispensed, and more particularly to a coin-operated liquid dispensing apparatus wherein coins, slugs, or similar means are used to predetermine the amount of liquid to be dispensed, and wherein said coins, slugs or similar means, condition means for rendering the liquid dispensing apparatus inoperative after said predetermined amount of liquid has been dispensed.

It is an object of this invention to provide a liquid dispensing apparatus provided with preselecting mechanism which is operated to a selected position by coins or tokens inserted therein, said preselecting mechanism rendering the liquid dispensing apparatus inoperable to dispense liquid after an amount of liquid of the value of the said coins or tokens inserted has been dispensed.

Another object is to provide a liquid dispensing apparatus having dispensing means, a valve in said dispensing means, registering mechanism for showing the amount and/or cost of the liquid dispensed, said valve being so connected to said registering mechanism that it can only be opened for dispensing when the registering mechanism is in a predetermined position, and coin control mechanism so constructed and arranged and associated with said registering mechanism and valve that it causes the valve to close when an amount of liquid of the value of the coins has been dispensed.

Still another object is to provide coin or token operated preselecting mechanism for operating control means for an apparatus, said mechanism being controlled by registering means, the control means being for the purpose of limiting the operation of said apparatus in accordance with the coins or tokens inserted therein, said control means being conditioned to a predetermined position only when the registering means has been moved to a predetermined position.

A further object is to provide coin or token operated preselecting mechanism for a liquid dispensing apparatus.

A still further object is to provide coin operated preselecting mechanism for a liquid dispensing aparatus wherein preselection is made in the cost of the liquid to be dispensed, and wherein a token is returned for the liquid due but not dispensed.

Another further object is to provide coin or token operated preselecting mechanism for a liquid dispensing apparatus which positively prevents liquid from being dispensed after the selected cost of the liquid has been registered.

A still further object of the invention is to provide preselecting mechanism for controlling a liquid dispensing aparatus wherein the mechanism is operatively associated with the register and wherein having once dispensed a predetermined amount of liquid, the liquid dispensing apparatus is rendered inoperative until the register has been reset.

A different object of the invention is to provide a coin control mechanism for a liquid dispensing apparatus wherein the coin receiving means is so const ucted and arranged that it is impossible to insert more than one coin at a time, but wherein, if coins are inserted in succession, the amount of said coins is added into the selecting mechanism so that liquid is dispensed in accordance with the total value of the coins inserted.

Still a different object of the invention is to provide a coin controlled preselecting liquid dispensing apapratus wherein means is provided to show the selected amount until the register of said liquid dispensing apparatus has been reset.

Another different object of the invention is to provide a coin controlled liquid dispensing apparatus wherein, having once started to dispense, additional coins cannot be inserted until the preselecting mechanism has returned to zero.

With these and various other objects in view, the invention consists of certain novel features of construction and operation as will be more fully described and particularly pointed out in the specification, drawings and claims appended hereto.

In the drawings, which illustrate embodiments of the device and wherein like reference characters are used to designate like parts—

Figure 1 is an elevation, partly in section, of a liquid dispensing apparatus provided with coin-operated preselecting mechanism embodying the invention;

Figure 2 is an enlarged side elevation of a registering mechanism such as illustrated in the liquid dispensing apparatus shown in Figure 1, showing the connecting means for operating said preselecting mechanism;

Figure 3 is a fragmentary side elevation of a liquid dispensing apparatus showing the application thereto of a form of preselecting device embodying the invention, showing the parts in position to receive coins.

Figure 4 is a fragmentary sectional elevation taken substantially in the plane as indicated by the line 4—4 of Figure 3;

Figure 5 is a fragmentary vertical sectional elevation taken substantially in the plane as indicated by the line 5—5 of Figure 3;

Figure 6 is a side elevation, partly in section, of a portion of the money cam shaft assembly shown in Figure 5;

Figure 7 is an end elevation looking toward the right as viewed in Figure 6;

Figure 10 is a fragmentary top plan view of the mechanism illustrated in Figure 3, the section in said plan, however, being taken substantially in the plane of the line 10—10 of Figure 3;

Figure 11 is an end elevation of the chain and sprocket illustrated in Figure 10, the same looking toward the right as viewed in said figure;

Figures 12 and 13 are plan views of the clutch plates adjacent the sprocket mechanism, the same being shown in Figure 10;

Figure 16 is a fragmentary sectional elevation of a portion of the valve control mechanism, the same being taken substantially in the plane as indicated by the line 16—16 of Figure 10;

Figure 17 is an enlarged fragmentary elevation showing the connection between the valve operating shaft and the valve shaft;

Figure 18 is a sectional elevation taken substantially in the plane as indicated by the line 18—18 of Figure 17;

Figure 19 is a fragmentary elevation of a portion of the valve trip mechanism, the same being taken substantially in the plane as indicated by the line 19—19 of Figure 8;

Figure 20 is a sectional plan through the valve and control shaft, the same being taken substantially in the plane as indicated by the line 20—20 of Figure 24;

Figure 21 is a sectional plan of the valves taken substantially in the plane as indicated by the line 21—21 of Figure 22;

Figure 25 is a frgamentary sectional elevation through the casing of a liquid dispensing apparatus embodying the invention, the same showing the drive between the coin mechanism and the preselecting mechanism;

Figure 26 is a fragmentary top plan view of one of the coin slides shown in Figure 25;

Figure 27 is a top plan view, partly in section, of the interlock mechanism for preventing operation of more than one coin slide at a time, and for preventing operation of said coin slides unless the preselecting mechanism is in a predetermined position;

Figure 28 is a sectional elevation taken substantially in the plane as indicated by the line 28—28 of Figure 27;

Figure 29 is a transverse sectional elevation taken substantially in the plane as indicated by the lines 29—29 of Figures 27 and 28;

Figure 30 is a fragmentary sectional elevation through the casing of a liquid dispensing apparatus embodying coin selecting mechanism and showing a token or coin return mechanism therefor;

Figure 31 is a fragmentary sectional elevation of the liquid dispensing apparatus casing looking toward the left as viewed in Figure 30;

Figure 32 is a fragmentary sectional plan taken substantially in the plane as indicated by the line 32—32 of Figure 30;

Figure 33 is a fragmentary sectional elevation of a portion of the control mechanism for the token return mechanism illustrated in Figure 30;

*Liquid dispensing apparatus*

Figures 8, 9:
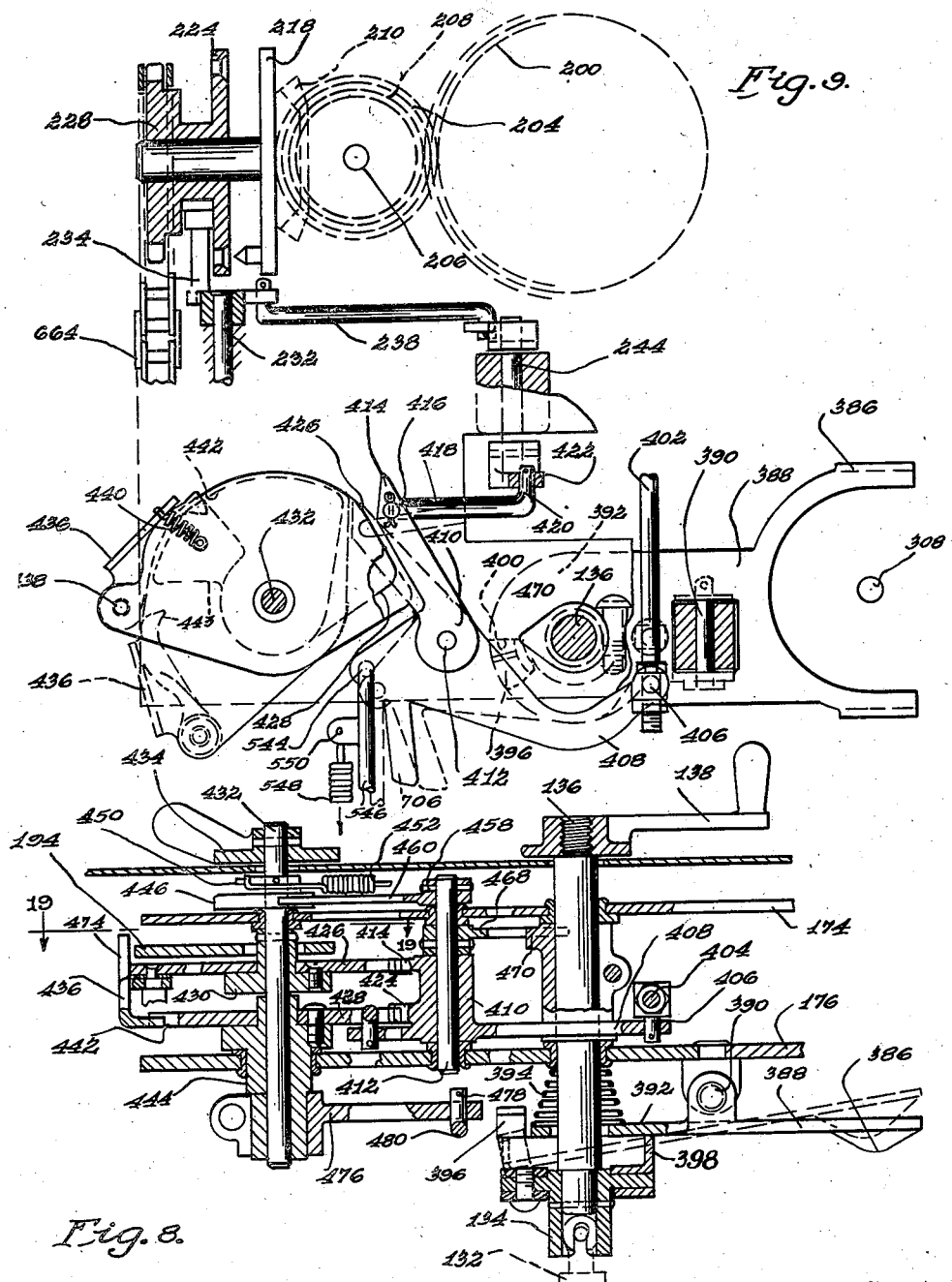
Figure 8 is a fragmentary sectional plan view of a portion of the reset mechanism and the valve control mechanism, the same being taken substantially in the plane as indicated by the line 8—8 of Figure 3.
Figure 9 is a fragmentary vertical sectional elevation taken substantially in the plane as indicated by the line 9—9 of Figure 10.

Referring first of all more particularly to the liquid dispensing apparatus illustrated in Figure 1, the apparatus consists essentially of a base 50 supporting a casing 52, said casing being internally reinforced by suitable internal bracing such as illustrated generally at 54 for mounting the pump 56, the suction side 58 of which is adapted to be connected to a source of liquid supply (not shown).

The outlet side of said pump is connected to the piping 60, which in turn is connected to the inlet of the air separator 62, the drain back 64 from said separator being connected as at 66 to the suction side of the pump, the atmosphere chamber of the air separator being vented to the atmosphere by means of the pipe 68, which extends to a high point in the casing 52, being vented through the hooded opening shown generally at 67. The outlet side of the pressure chamber of the separator is connected as at 69 to the inlet side of the meter 70.

The outlet side of the meter 70 is connected to the piping 72, which is connected to the inlet side of the visi-gauge 74, the outlet side of the visi-gauge being connected to the piping 76 to which the dispensing hose (not shown) is connected. The other end of said hose is connected to the nozzle 78, which is shown in supported, inoperative position on the fixed support 80. The nozzle is provided with a nozzle guard 82 and a dispensing lever 84 is disposed within said guard and is adapted to control the usual dispensing valve. In supported position the outlet 86 of said nozzle is adapted to project into the boot 88 provided in said casing, and the lever 84 is locked against dispensing movement.

The pump is adapted to be operated by means of the motor 90, said motor being provided with the pulley 92 adapted to receive the belt 94, which in turn is received by the pulley 96 provided on the pump shaft.

The motor is controlled by means of the switch 98, which is connected through the rod 100 to one arm of the bell crank 102. Said bell crank is pivoted to the casing as at 104, one arm 106 of said bell crank being adapted to be engaged by the pushbutton 108 disposed below the fixed support 80 which, when projected inwardly, moves the bell crank in a clockwise direction to close the switch 98. Another arm 110 of said bell crank is adapted to be engaged by the pushbutton 112 disposed above the fixed support 80 and being engageable by the pivoted lever 114, which in turn is adapted to be engaged by the guard 82 when the nozzle is placed on the support. When the pushbutton 112 is in its inward position, it has moved the bell crank in a counterclockwise direction to open the switch.

The bell crank is provided with the arm 116 connected as at 118 to the interlock 120, said interlock being connected through the shaft 122 to the registering mechanism 124 of the computing head 126, and said interlock is arranged in such a way that, having opened the switch, the register must be reset to zero or to a predetermined position before the switch can be reopened to dispense an additonal amount of liquid. This interlock may be of the construction such as is shown and described in Patent No. 2,191,870, granted February 27, 1940, to Frederick W. Sturm. Also, said interlock prevents the register from being reset while the switch is closed. The register is adapted to be operated by the variator 128 which may be of a construction such as shown in Slye Patent No. 2,111,996, granted March 22, 1938, and is adapted to be driven by means of the meter shaft 130, said meter shaft being rotated by the meter in proportion to the amount of liquid passing through the meter.

Registering mechanism

The register 124 is provided with a reset shaft 132 which is coupled as at 134 (Figures 3, 7 and 19), to the shaft 136, said shaft being provided with the reset crank 138. The register is of the well known numeral wheel or direct reading type such as used in dispensing pumps now being sold, and includes a lower bank of numeral wheels 140 for registering the number of gallons or parts thereof dispensed. The register is also provided with the upper banks of numeral wheels 142 adapted to indicate the cost of the number of gallons dispensed.

Price synchronizing means (not shown) such as shown in the Slye et al. Patent No. 2,151,239, granted March 21, 1939, may also be used, and the register is driven in the well known manner by the meter shaft 130. The cost numeral wheels 142 are driven through the variator 128, all as shown and described in said Patent No. 2,111,996, and the gallons numeral wheels are driven through a gear train from the meter shaft. In each case, due to the width of the variator, there is provided an idler gear for driving suitable numeral wheel driving gears 143 and 145 provided on the shafts 144 and 146 of the gallons and money registering wheels, respectively, for driving the lowest denomination wheel. The idler gears 162 for driving the gallon wheels 140 through the gears 143 are mounted on the shaft 148, and the idler gears 168 for driving the money wheels 142 through the gears 145 are mounted on the shafts 150 respectively. It is understood that the lower value numeral wheels transfer their motion to the higher value numeral wheels in the well known manner through the Geneva or other transfer mechanism indicated generally at 151. In resetting operation, rotation of the crank 138 sets all of the numeral wheels to zero (0) in the well known manner.

A support 152 (Figure 2) is secured to the register and is provided with a suitable shaft 156 having a coupling 160 thereon, the shaft 156 being provided with the gear 166 of the same size as the gear 145. The gear 166 is adapted to drive the gear 167, mounted on the shaft 150 at the right of the register as viewed in Figure 2. The gear 167 is of the same size as the idler gear 168 and rotates with said gear on said shaft 150 at the right of Figure 2 for driving the money numeral wheels through the gear 145 whereby the shaft 156 rotates at the same speed at which the units or lowest denominational money wheel rotates.

Preselecting mechanism

The liquid dispensing apparatus is provided with the preselecting mechanism indicated generally at 170 (and in Figures 3, et seq.), said preselecting mechanism being so constructed and arranged that it may be rendered inoperative to permit the liquid dispensing apparatus to be operated continuously, or the preselector may be operative to control the liquid dispensing apparatus through the coin control mechanism indicated generally at 171. The preselecting mechanism is sometimes herein referred to as preselector means or mechanism. The preselecting mechanism is mounted within the pump casing and is provided with the spaced supporting plates 174 and 176. The shaft 178 is supported by the plates 174 and 176 (Figures 3 and 4), and is provided with the dial 180 secured to the back plate 182, said back plate being non-rotatably mounted on the shaft 178 through sleeve 179, said back plate being secured to said sleeve as at 184 whereby said dial rotates with said shaft.

The plate 186 is also secured to said shaft through fastening 184, sleeve 179 and sleeve 187 in spaced relation to the plate 182, and the trip roller 188 is rotatably mounted between the plates 182 and 186 as at 190, said roller being placed in a predetermined position with relation to the zero indicium 192, whereby it moves the lever 194 downwardly to a predetermined position when the zero indicium is visible to the operator, the lever 194 being pivotally mounted as at 196 to the plate 176. The operation of the roller 188 in depressing lever 194 is shown in dotted lines in Figure 3. The dial 180 is provided with the indicia graduated in five cent (5¢) increments and in the embodiment shown, the highest indicium is $2.20, a stop being provided on the dial as at 195 adapted to engage the stop 197 (Figure 3) on the plate 176 for preventing the dial from being rotated past $2.20 in an increased direction.

The subtracting ratchet 198 is provided on the plate 186 mounted on shaft 178. and, in the embodiment shown, said ratchet is provided with forty-five teeth. In other words, said ratchet must be provided with the number of teeth determined by the indications on the dial and the increments of subtraction. A spacing pawl 199 is pivotally mounted at 201 to plate 176 adjacent the ratchet 198 spring-pressed toward said ratchet so that it is always forced between teeth of the ratchet, insuring proper registration of the numeral of the dial. The ratchet 198 is provided with the timing gear 200, said gear 200 meshing with the gear 204 non-rotatably provided on the shaft 206, said shaft 206 extending through the back plate 176 and (Figure 10) being provided with the gear 208 non-rotatably mounted thereon. The gear 208 meshes with the gear 210 (Figure 10) non-rotatably provided on the sleeve or hub 212 journaled on the shaft 214, said shaft being fixed to the housing or bracket 216 carried by the plate 176. The sleeve 212 is provided with the clutch plate 218 having the pin 220 thereon adapted to engage in suitably spaced apertures 222 provided in the clutch member 224, said clutch member being rotatably mounted on the shaft 214 and being provided with the sleeve or hub 226 having the sprocket 228 thereon.

The clutch plate 224 is adapted to be moved along the shaft 214 to engaging or disengaging position (engagement or disengagement of 220 and 222) by means of the lever 230 pivoted to the housing 216 as at 232, the lever being provided with the clutch operating roller 234 received in the recess formed between the spaced members 224 and 228. The lever 230 is pivoted as at 236 to the rod 238, said rod being pivoted as at 240 to the lever 242, said lever being pivotally mounted on the housing 216 through the shaft 244 fixedly connected to said lever 242 (Figures 9 and 10).

The shaft 178 (Figure 4) is provided with the sleeve 248 rotatably mounted thereon, said sleeve being provided with the pawl carrier or lever 250 (Figures 3 and 4), said pawl carrier extending upwardly and being provided with the pawl 252 pivoted to said carrier as at 254 and being adapted to be urged toward contacting position with the ratchet 198 by means of the spring 256 (Figure 3). The pawl is provided with the lateral flange 258 (Figure 10) adapted to overlie the release lever 260 pivoted as at 262 to the plate 176. The release lever 260 is provided with the arcuate surface 264 providing a track for the flange 258, permitting the pawl 252 to ride on the surface 264 out of engagement with the ratchet and to predetermined position, such as when the registering mechanism is being reset to zero (0), or when the device is set for continuous service, that is, where the preselecting mechanism is inoperative.

In order to set the device for continuous service, that is, to render the preselecting mechanism inoperative, it is necessary to lift the lever 260. In order to lift the lever 260 the bell crank 266 is pivotally mounted on the shaft 268, said bell crank being provided with the depending arm 270 having the pin 272 thereon adapted to be moved to engage and lift the lever 260 to the dotted line position as viewed in Figure 3. The bell crank is provided with a locking shoulder 274 adapted to be engaged by the spring-pressed latch 276, pivoted adjacent thereto as at 278 for locking the lever 260 in upward position. The bell crank is provided with the arm 280 pivotally connected as at 282 to the rod 284, said rod being slidably connected as at 286 to the arm 288 provided on the valve control shaft 290. The connection 286 is so constructed and arranged that a certain amount of lost motion is permitted. In other words, enough lost motion must be provided so that when the device is being operated as a preselector, the valve itself can be operated without operating the bell crank 266.

The pawl carrier 250 is pivoted as at 292 to the rod 294 (Figure 3), said rod being pivoted as at 296 to the cam lever 298, said cam lever being pivoted as at 300 to the support 176. The cam lever is provided with the cam surface 302, and at its other end is provided with the cam engaging member 304 adapted to engage the cam 306 rotatably provided on the journalling shaft 308. The cam lever is provided with the guide and limiting means 310 disposed on the plate 176, and the cam 306 is provided with the shoulders 312 disposed 180° apart. The returning cam 314 is non-rotatably provided on the cam 306 between the shoulders 312, said cam having double lobes adapted to engage the lower arm 316 of the returning lever 318, said lever being pivoted as at 320 to the plate 176. The upper arm 322 of said lever is adapted to engage the cam surface 302 whereby rotation of the cam 314 causes the lever 298 to be rotated in a counterclockwise direction and the rotation of the cam 306 causes rotation of the cam lever 298 in a clockwise direction, thus causing oscillation of the pawl carrier 250 for causing the pawl 252 to operate the ratchet 198.

As already pointed out, the cams 306 and 314 are rotatably mounted on the journalling shaft 308, being fixedly provided on the cost cam shaft or sleeve 324 (Figure 5), said sleeve extending through the plate 176 and being provided with the cam 326 (Figures 5 and 14) fixedly mounted thereon. The cam 326 is also provided with the spaced shoulders 328 disposed 180° apart, said shoulders being so related to the shoulders 312 of the cam 306 that they cause operation of their associated member in a predetermined manner with respect to the operation of the mechanism associated with cam 306. In the embodiment shown, the operation of the shoulders 328 is subsequent to the operation of the shoulders 312.

The cam 326 is adapted to engage the end member 330 (Figure 14) of the cam lever 332, said cam lever being provided with the guiding and limiting means 334 and is pivoted as at 336 to the plate 176. The cam lever 332 is pivotally connected as at 338 to the rod 340, said rod being pivotally connected as at 342 to the pivoted plate 344, said plate being limited in its movement by the stop 346. The plate 344 is pivoted on the shaft 262, and said plate is urged toward the stop 346 by means of the spring 348, one end of said spring being pivoted as at 350 to the plate, the opposite end thereof being anchored as at 352 on the support 176.

The plate 344 is provided with the flange 354 adapted to engage the latch member 356, said latch member also being pivoted on the shaft 262, the latch member 356 following the flange 354 by action of the spring 357 disposed between the members 344 and 356. The latch member 356 is provided with the arm 358 for engaging the stud 360 provided on the member 362 fixedly mounted on the valve control shaft 290. The member 362 is adapted to engage under the flange 364 of the member 356 for maintaining the shaft 290 in the position where the dribble valve, to be later described, is open, but the main valve is closed.

The cam 326 (Figures 5 and 14) is provided with the spaced lugs 366 which may be formed by bent out portions on the face of the cam, said lugs being spaced 180° apart and forming an overrunning clutch with the carrier member 368 (Figures 5, 6 and 7) non-rotatably mounted on the shaft 308, said member 368 being provided with the connection 370 for receiving the shaft rod 372, said shaft being connected at its opposite end to the coupling 160 (Figure 2) of the registering mechanism.

In order to form the overrunning clutch the carrier member 368 is provided with the guiding and limiting member 374 (Figures 5, 6 and 7) acting as a retainer to limit the movement in a counterclockwise direction of the clutch pawl 376, the clutch pawl being pivoted as at 378 to the member 368, and being provided with the spring 380 urging said pawl in a counterclockwise direction as viewed in Figure 6. The pawl is also provided with the projection 382, adapted to engage the members 366 whereby said members may be driven from the shaft 372.

In order to move the member 382 out of its effective position with respect to the lugs 366, in other words, to render them inoperative, the member 376 is provided with the raising member 384, the member 384 being adapted to contact the raising cams 386 provided on the bifurcated end of the pawl lifting lever 388 (Figures 5, 8 and 9), it being seen that the bifurcated end of the lever 388 embraces the shaft 308 and is disposed between the members 326 and 374 (Figure 5). The lever 388 is pivoted as at 390 to the support 176 and is provided with the extension 392 spring-pressed as at 394 to tend to rotate the member 388 in a counterclockwise direction as viewed in Figure 8, the member 392, however, being provided with the inclined lug 396 adapted to be engaged by the cam lug 398 provided on the coupling 134 connected to the reset shaft 136. It will be seen that when the register is reset to zero, the shaft 136 will rotate, causing the lever 388 to be moved from the dotted line position to the full line position (Figure 8), as the member 398 will be rotating over the face of the member 392, that is, the member 398 will ride out of the depression 400 formed by the depressed lug 396. As the register is being reset the shaft 372 (Figure 5) will be rotated, causing rotation of the coupling 370 and the member 374. Unless an amount of liquid has been dispensed in even increments of five cents (5¢) in the embodiment shown, the member 382 will engage the lugs 366 to move the cam 326 until either the zero or the five position is reached, depending upon which is closest in a return direction; at which time the member 384 will engage a cam 386 to disengage the member 382 from the lugs 366, whereby it will be seen that the liquid dispensing apparatus can still dispense liquid to the amount determined by the remaining value of the coins inserted, but to the nearest (diminishing) five cent (5¢) increment.

The rod 402 (Figures 3, 4, 8 and 9) is slidably mounted as at 404 on the support 176, and is adapted to abut the lever 260 at one end, and at its other end is pivotally connected as at 406 (Figures 8 and 9) to one arm 408 of the lever 410, the lever 410 being pivoted on the shaft 412. The lever is provided with the arm 414 pivotally connected as at 416 to the rod 418, said rod being pivotally connected as at 420 to the arm 422 fixedly mounted on the shaft 244. The lever 410 is provided with the arm 424 (Figure 8), similar to the arm 414, the arms 414 and 424 being adapted to engage the cams 426 and 428.

The cam 426 is fixedly mounted on the sleeve 430 which is fixedly mounted on the shaft 432, said shaft 432 being provided with the operating member 434, the full line position of said member, as shown in Figure 3, being the valve open position; and the dotted line position shown in said figure being the valve closed position. The cam 426 is provided with the pawl 436 pivoted thereto as at 438 and being urged toward operative position by means of the spring 440. The pawl is adapted to engage the ratchet shoulder 442 on the cam 428, said cam being fixedly mounted on the sleeve 444 pivotally mounted on the shaft 432 extending through the support 176.

The shaft 432 is provided with the cam 446 (Figures 3 and 8), having the locking shoulder 448 thereon and being provided with the arm 450 to which one end of the spring 452 is secured as at 454, the other end of the spring being secured as at 456 to the support 174. The lever 458 is fixedly mounted on the shaft 412, the lever being provided with the arm 460 adapted to engage the shoulder 448, being urged into engagement with said shoulder by means of the spring 462 connected to said lever at 464, and to the support 174 as at 466. The lever 458 is provided with the oppositely extending arm 468 adapted to be engaged by the cam 470 fixedly mounted on the reset shaft 136.

It will thus be seen that when the reset cam 138 is rotated in a clockwise direction, as viewed in Figure 3, to reset the register, the cam 470 moves the lever 458 in a counterclockwise direction, as viewed in Figure 3, against the spring 462 to cause disengagement between the arm 460 and the shoulder 448 to permit the spring 452 to rotate the member 434, and consequently the shaft 432, in a counterclockwise direction from valve open to valve closed position. The member 194 (Figures 3 and 19) is provided with the bifurcated end 471 having the lifting portion 472 which is arcuate and adapted to engage the projection 474 provided on the pawl 436, whereby movement of the member 194 by the roller 188 in a clockwise direction about the pivot 196 causes the member 472 to lift the pawl 436 out of engagement with the shoulder 442 of the cam 428.

As before pointed out, the shaft 432 is provided with the sleeve 444 rotatably mounted on the shaft 432, and said sleeve 444 is provided with the arm 476 (Figures 8 and 16), said arm being pivotally connected as at 478 to the rod 480, the other end of said rod being pivoted as at 482 to the arm 484 of the bell crank 486 (Figures 16, 17 and 18). The bell crank 486 is fixed to rotate with the shaft 488 pivotally mounted as at 490 on the support 176, and said shaft extends to and is connected to the coupling 492 of the valve operating shaft 493 of the operating valve 494. The bell crank 486 is provided with the arm 496 which is loosely connected as at 498 to the lever 500, said lever being fixedly mounted on the shaft 290. The lever is provided with the arm 502 connected as at 504 to one end of the spring 506, the other end of said spring being connected as at 508 to the support 176 whereby the lever 500 is urged in a clockwise direction as viewed in Figure 17.

The valve operating shaft 493 extends into the casing 510 of the valve 494, being journalled therein and being provided with the arm 512 extending inwardly and being adapted to be received in the spaced members 514 of the valve stem 516. The valve stem extends upwardly and is slidably received in the dashpot 518 of the spider 520. The lower end of the valve stem 516 is provided with the main valve 522 adapted to be closed against the seat 524, being urged to valve closing position by means of the spring 526, one end thereof engaging the valve 522, and the other end thereof being seated on the spider 528. The stem of the main valve 522 is provided with the hollow portion 530, in which the substantially square valve stem 532 of the dribble valve 534 is mounted.

The dribble valve is adapted to be closed against the seat 536 provided in the main valve, being urged toward closed position by means of the spring 538 seated at one end on the dribble valve, and at the other end on the member 540 provided on the main valve, said member being provided with the aperture 542 permitting ingress of liquid to the dribble valve.

Coin control mechanism

The lever 410 is pivotally connected as at 544 (Figures 9, 25 and 30) to the rod 546, and is urged in a counterclockwise direction by means of a spring 548 secured to said rod as at 550, the other end of said spring being connected to an extension (not shown) on the support 176. The other end of the rod 546 is pivotally connected as at 552 (Figures 25 and 29) to the arm 554 of the lever 556, the lever 556 being pivoted as at 558 on the bracket 560 provided on the coin control interlock 562, the lever being provided with the interlocking arm 564. The interlock 562 consists essentially of a plurality of housings 566, 568 and 570 corresponding, in the embodiment shown, to coin values of twenty-five cents (25¢), ten cents (10¢) and five cents (5¢) respectively.

The interlock slides 572, 574 and 576 are slidably mounted on the housings 566, 568 and 570, respectively, one end of said slides being connected as at 578, 580 and 582 to the links 584, 586 and 588, said links being respectively connected as at 590, 592 and 594 to their respective coin slides 596, three being used in the embodiment shown, one for twenty-five cents (25¢), one for ten cents (10¢) and one for five cents (5¢). Said coin slides are similar in construction to that shown in Patent No. 2,095,431 to Kenly C. Bugg, granted October 12, 1937. The interlock slides 572, 574 and 576 are each provided with the spaced cylindrical portions 598 and 600 journaled respectively in the members 566, 568 and 570, the spaced cylindrical portions 598 and 600 being connected by the stem members 602 of smaller diameter than the members 598 and 600, and being adapted to be disposed in substantial alignment with the transverse cylindrical housing 604 connecting the housings 566, 568 and 570.

The stems 602 are connected to the members 598 and 600 by the frusto-conical portions 606 and 608. The interlock bar 610 is slidably mounted in the housing 604, being urged toward the five cent (5¢) end by means of the expansion spring 612, one end of said spring being seated in the bar 610 as at 614, the other end of said spring being seated on the seat 616 closing one end of the member 604. The stems 602 extend through the holes 618, 620 and 622 of the interlock bar 610, said holes being of substantially the same diameter as the diameter of the interlock slides. In the position illustrated in Figure 27, the interlocking bar is in its extreme projected position toward the five cent (5¢) end of the device, in which case the stem 602 of the twenty-five cent (25¢) slide is contacted by the bar as at 624, that is, at one side of the aperture 618. The stem 602 of the ten cent (10¢) slide is spaced from the aperture 620 as at 626, said space 626 being one-third of the space 628. The division of this space is determined by the number of interlock slides, that is, if these are three, the space is divided by three; should there be four, the space would be divided by four, etc. The stem 602 of the five cent (5¢) slide is spaced from the periphery of the aperture 622, as at 630, said space being twice the width of the space 626.

In the position of the bar as shown in Figure 27, the interlock slot 632 of the bar registers with the slot 634 provided in the housing 604 for reception of the interlocking arm 564 of the lever 558 whereby when the arm 564 is in its lowermost position, as illustrated in Figure 29, that is, in the slot, the bar 610 will be locked against movement, and the coin slides 596 cannot be operated to receive coins, as they will be in their innermost position where the coin apertures 636 (Figure 26) will be concealed. In other words, the slide will be in the position as shown at 596—A (Figure 25).

In order to insert the coin, the arm 564 of the lever 558 must be raised out of the slots 632 and 634, at which time a selected slide may be moved to the coin receiving position as shown in 596—B (Figure 25), whereupon the proper coin for the selected slide may be inserted and then projected inwardly by movement of the slide to the position as shown in 596—C (Figure 25), at which time the coin is dropped into the coin box 638. The coin box of course may be conveniently mounted in the pump casing 52, and may be closed by the door 640 adapted to be locked at 642.

Connection between preselector and coin control mechanisms

The sprocket 228 is connected through the chain 644 (Figures 1, 9, 10, 11 and 25) to the sprocket 646 of the same diameter as the sprocket 228, the sprocket 646 being non-rotatably mounted on the shaft 648 of the coin-control mechanism. The shaft 648 is provided with the ratchets 650, one ratchet being provided for each coin slide, and the number of teeth on said ratchets being determined by the amount of the coin slide. The movements of the ratchets 650 determine the movements of the sprockets 646 and 228.

The ratchets are locked against movement in a counterclockwise direction by means of the locking pawl 652, and the pawl carriers 654 are pivotally mounted on the shaft 648, being urged in a clockwise direction by means of the springs 656 connected as at 658 to said carriers, the other end of said springs being conveniently anchored. Each of the pawl carriers is provided with the projection 660 adapted to limit the clockwise direction of the pawl carrier by its abutment with the stop 662, and the respective projections 660 are adapted to be engaged by the respective slides whereby, when the slides are moved inwardly, the pawl carrier is rotated in a counterclockwise direction limited by the innermost movement of said coin slides, and so constructed and arranged that when the slides are in their innermost position, at which time they drop the coin into the coin box, the respective projections 660 are released to permit the pawl carrier to move back to its initial position.

Each pawl carrier is provided with the spring-pressed pawl 664 adapted to engage the respective ratchet 650 whereby the spring 656 causes the pawl 664 to move the ratchet 650 in a clockwise direction to the amount as determined by the amount of the coin whereby the sprocket 646 causes rotation of the sprocket 228 a predetermined amount, thus causing the dial 180 to be rotated an amount corresponding to the value of the coin, the cumulative amount of rotation being ultimately indicated in the window 668 in the casing 52.

*Token or coin dispensing means (Figures 30 to 33 inclusive)*

In the event it is desired to provide a token or coin dispenser on the pump so that a token or a coin may be dispensed to a purchaser, in the event the total amount of gasoline initially desired is not dispensed, the gear 670 (Figures 5 and 30) is rotatably mounted on the cam shaft or sleeve 324, the gear being adapted to be connected to the sleeve 324 by means of the spring-pressed pawl 672 provided on the gear and adapted to engage either of the shoulders 674 disposed 180° apart and representing five cent (5¢) increments in the device shown.

In order to prevent improper reverse rotation of the gear 670 and its associated mechanism, said gear is provided with the ratchet 676 adapted to have cooperative engagement with the pawl 678 pivoted on the shaft 320 and being urged by the spring 680 toward engagement with the ratchet 676. The gear 670 meshes with the gear 682 pivoted on the shaft 683, the gears 670 and 682 being in a two-to-one ratio, said gear 682 being non-rotatably provided with the bevel gear 684 meshing with the bevel gear 686, non-rotatably provided on the shaft 688, the shaft extending through the casing 52 and being provided with the control crank 690.

The locking disk 692 is non-rotatably mounted on the shaft 688 and is notched at 694 to receive the locking bar 696, the locking bar being provided with the recess 698 adapted to be moved to register with said gear to permit rotation of the handle 690. The locking bar extends inwardly and is pivoted as at 700 to the lever 702 (Figures 30, 32 and 33) said lever being pivoted on the shaft 412 and being provided with the spaced arm 704, also pivoted on the shaft 412. The lever 410 is provided with the depending finger 706 adapted to be disposed to contact the transverse connection 708 connecting the arm 704 to the lever 702. The lever 476 (Figures 16 and 30) is provided with the cam 711, the cam being adapted to have cooperative engagement with the shoulder 712 provided on the projecting member 714 carried by the arm 704.

The gear 682 meshes with the same size gear 716 (i. e., in a one-to-one ratio), said gear 716 being pivotally mounted as at 718 and being provided with the eccentric 720. The rod 722 is mounted on said eccentric 720 to be reciprocated thereby, the lower end of said rod being pivoted as at 724 to the lever 726 operatively connected as at 728 to the control member for the token or coin change reservoir 730. Oscillation of the lever 726 releases a token or a coin which passes down the chute 732 to the coin receptacle 734 disposed on the housing 52. The reservoir is disposed inside of the housing and can only be replenished by entering the housing through a suitable door (not shown) which is preferably kept locked.

*Operation*

In operation of the liquid dispensing apparatus illustrated, let it be assumed that the switch 98 is in open position, at which time the motor 90 is inoperative. Should the computing head 126 be in other than zero position, the reset crank 138 and its shaft 136 are rotated in a counter-clockwise direction, as viewed in Figure 3, causing rotation of the shaft 132 to zeroize the numeral wheels. Rotation of the crank 138 causes the cam 470 to move the lever 458 in a counterclockwise direction to release the lever arm 460 from the cam 446, should it be in engagement with said cam. The spring 452 will then move the lever 434 to valve-closed position.

In the event the pump has been stopped before the full amount last preselected has been dispensed, and the amount due involves an amount not divisible by five, or less than five, rotation of the shaft 372 (Figure 5) rotates the member 368 and, as already explained, the member 382 will rotate the cam 326 (Figures 5 and 14) through either of the lugs 366. However, when the member 368 starts to rotate, the member 398 will have moved out of the slot 400 (Figures 8 and 9) and up the incline member 396 to ride on the face of the member 388, causing the member to be moved in a clockwise direction about the pivot 390, as viewed in Figure 8, (i. e., to the full line position) to dispose the cam 386 in a position so that when either the five or zero position has been reached, the member 384 will position has been reached, the member 382 from the lug 366, and continued rotation will cause no further movement of the cam 326, as the member 382 will always pass over the lugs 366. The dial 180 will always be in its proper position, wherein the proper numeral registers in the window 668 because the spacing pawl 199 will force the gear 198 to proper position.

The dial 180 will not be zeroized unless the full selected amount of gasoline has been dispensed, or unless the token or coin or change return mechanism has been operated. In order to operate the mechanism, assuming that change is due, the locking bar 696 (Figure 30) is moved inwardly against the spring 705 to a point where the recess 698 registers with the disk 692. In that position the crank 690 can be rotated causing the gear 686 to rotate the gear 684, which in turn rotates the gear 716, causing rotation of the eccentric 720, thereby reciprocating the rod 722 to oscillate the lever 726 controlling the coin or token receptacle mechanism, thereby expelling coins or tokens through the chute 732 to the receptacle 734.

The change return, in the embodiment shown, is in tokens representing the smallest amount of the coins used, that is, in the case shown, in nickels (5¢). Rotation of the gear 682 rotates the gear 670, causing the pawl 672 on the gear to rotate the cam shaft or sleeve 324 (Figures 5 and 30). As the pawl 672 engages either of the shoulders 674, rotation of said sleeve 324 causes rotation of the cams 306 and 314 (Figures 3 and 5) independently of the shaft 372. Rotation of the cam 306 will cause oscillation of the cam lever 298, which operates the pawl carrier 250, which in turn causes the pawl 252 to ratchet the subtracting ratchet 198 to zero position, at which time a suitable stop prevents further movement of the dial, and consequently of the handle 690.

Inward movement of the bar 696 (Figure 30) causes a clockwise movement of the lever 702 against the spring 705, causing the contacting member 708 of the lever 702 to engage the arm 706 to move the lever 410 in a clockwise direction. Movement of the lever 410 in a clockwise direction causes upward movement of the rod 546 against the spring 548, which causes counterclockwise movement of the lever 556 as viewed in Figure 25, which in turn causes the arm 564 of the coin slide interlock to enter the slots 634 and 632 (Figures 27, 28 and 29), preventing movement of the interlock bar 610, which prevents the coin slides 596 from being moved to a position where coins may be recevied thereby. Additionally, movement of the lever 410 in said clockwise direction causes the rod 402 (Figures 3 and 30) to be moved downwardly, which permits downward movement of the release lever 260 to a position permitting the pawl 252 to engage the subtracting ratchet 198. Also, said clockwise movement of the lever 410 moves the rod 418 toward the right as viewed in Figure 9, causing rotation of the levers 422 and 242 (Figures 9 and 10) in a counterclockwise direction as viewed in Figure 10, to move the clutch member 224 to declutched position with relation to the clutch member 218, thereby disconnecting the coin slide mechanism from the preselector mechanism. Movement of the lever 702 in its clockwise direction moves the shoulder 712 (Figure 30) upwardly in way of the cam 711, preventing the valve operating lever 434 from being moved to open position in the event it is closed, but if the valve is in open position, the locking bar 696 cannot be moved inwardly to operate the token return, and the crank 690 cannot be rotated as the recess 698 will not register with the disk 692.

Assuming that the register is in zero position, and the preselector is in zero position, and the valve is in closed position, if it is desired to operate the pump continuously, the bell crank 266 is moved in a counterclockwise direction, as viewed in Figure 3, to a position where the arm 274 engages below the latch 276. In this position the pin 272 will have engaged the release lever 260 to raise said lever to a position where the pawl 252 is disengaged from the subtracting ratchet 198. Additionally, the rod 284 will be moved toward the left, as viewed in Figure 3, to disconnect the control valve from the preselector mechanism. The valve can then be opened by rotation of the member 434 which rotates the members 476, 486, and 500, and the shafts 488 and 493, the valve being locked in open position by engagement between the shoulder 448 and the arm 460 (Figure 3). In this position the starting button 108 can be pressed inwardly, assuming the nozzle 78 has been removed from the hook 80, inward movement of the starting button closing the switch 98 to start the motor 90, in which case dispensing of liquid can be had in the well known manner.

If, however, the register is at zero position and the preselector is in zero position, and the valve is in closed position, and it is desired to operate the device as a coin control apparatus, the clutch members 224 and 226 (Figure 10) will be in clutched position. The pawl release lever 260 will be in raised position so that the pawl 252 is not in engagement with the subtracting ratchet 198, and the coin control interlock lever 556 (Figures 25 to 29) will have been moved so that the arm 564 has been removed from the slots 632 and 634. It is then possible to move one of the coin slides at a time, outwardly to the position shown in 596—B, and the proper coin may be placed in its aperture 636.

It will be seen that when one of the coin slides is moved to coin-receiving position, neither of the other two slides can be moved to coin-receiving position, due to the fact that if, for example, the twenty-five cent (25¢) coin slide is moved outwardly, this interlock bar 610 will have been moved against the spring 612, and the member 600 will be in the aperture 618. In this position neither the apertures 620 nor 622 will be in registry with the respective members 600 of the interlock slides of the ten cent (10¢) or five cent (5¢) slides. Having placed a quarter (25¢) in the quarter slide, the slide may then be moved inwardly to the innermost position 596—C (Figure 25), in which position the coin will be expelled, dropping into the reservoir 638, and the slide will move the member 660 in a counterclockwise direction, and, at the end of its inward stroke, will release it to cause the pawl 664 to move the ratchet 650, by the spring 656, the calibrated amount for the particular coin.

Rotation of the ratchet 650 will cause rotation of the sprockets 646 and 228, which will cause rotation of the sleeve 212 through the clutch members 224 and 218. Rotation of the sleeve 212 will cause the gear 210 to rotate the gear 208, which in turn rotates the shaft 206. Rotation of the shaft 206 will cause the gear 204 to move the gear 200, and consequently the dial 180, to its proper position as determined by the value of the coin. Other coins may be applied in a similar manner, and the values thereof will be added to the dial to show the total selected amount in the window 668.

Figure 24:
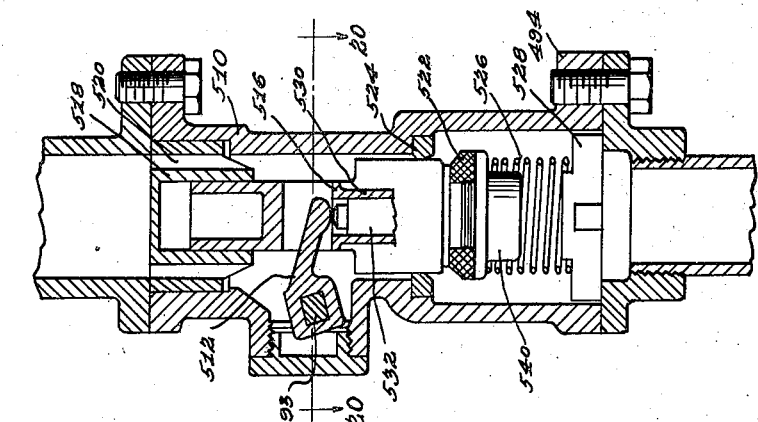
Figure 24 is an enlarged fragmentary sectional elevation through the control valve showing the same in fully opened position.

Assuming that the nozzle 78 has been moved from its support 80, the starting button 108 may then be moved inwardly to close the switch 98 to start the motor. However, no liquid can be dispensed until the valve actuating member 434 is moved to valve-open position, that is, moved in a clockwise direction as viewed in Figure 3, to the full line position as shown in said figure. Rotation of this member 434 to valve-open position, positions the cam 446 in a position where the member 460 of the lever 458 has been moved in way of the shoulder 448. Movement of this member to valve open position causes the pawl 436 on the cam 426 to move the cam 428 in a clockwise direction as viewed in Figure 9. Movement of the cams 428 and 426 in a clockwise direction rotates the sleeve 444 in a counterclockwise direction as viewed in Figure 16, which in turn rotates the bell crank 486, causing rotation of the arm 500 in a clockwise direction as viewed in Figure 16. Rotation of the bell crank 486 rotates the shaft 488, causing rotation of the valve shaft 493 in a clockwise direction, as viewed in Figures 22, 23 and 24, to move the lever 512 downwardly or in a clockwise direction, opening the valves 522 and 534. Liquid can now be dispensed.

The liquid passing through the meter 70 causes rotation of the meter shaft 130 to operate the register. Operation of the register rotates the coupling 160 (Figure 2), which rotates the shaft 372 (Figure 5), which in turn rotates the member 368, member 326, and the sleeve 324. Rotation of the sleeve 324 causes rotation of the cams 306 and 314 (Figure 3). Rotation of the cam 306 causes rotation of the cam lever 298 in a clockwise direction, and said lever will be returned by the oscillation of the lever 318 by the cam 314 to a position where it may be moved again by the cam 306.

When the valve is moved to open position, the cam 426 (Figure 9) will have moved the member 410 in a clockwise direction to move the rod 402 (Figures 3 and 9) downwardly, permitting the pawl carrying lever 260 to move the pawl 252 to engage the subtracting ratchet 198, whereby oscillation of the member 298 will cause oscillation of the pawl carrying member 250 to ratchet the subtracting ratchet 198 to return the dial toward zero (0) position.

Figure 15:
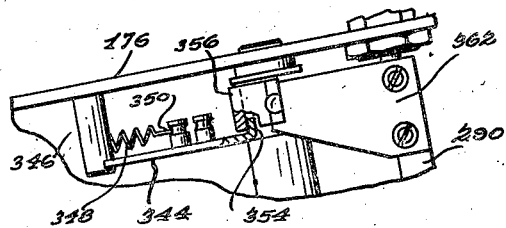
Figure 15 is a fragmentary top plan view of a portion of the valve control mechanism illustrated in Figure 14.
Figure 23:
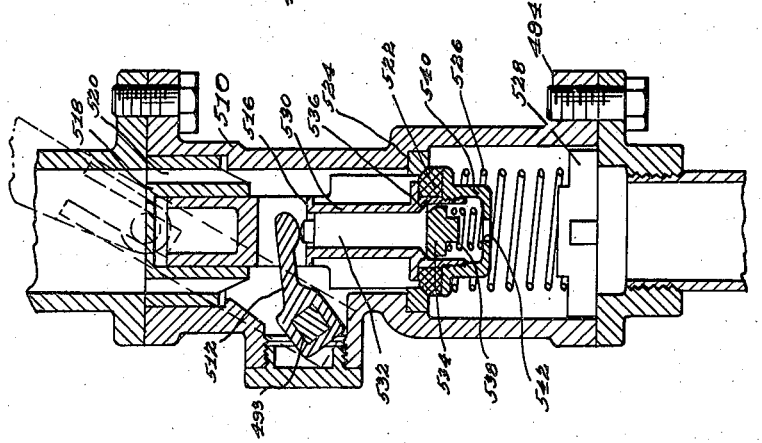
Figure 23 is an enlarged fragmentry sectional elevation showing the main valve in closed position, but the dribble valve in open position.

In the liquid dispensing apparatus now in use, liquid is dispensed at a relatively high rate, and therefore it would be difficult to provide a valve large enough to permit this flow, which valve could be closed immediately, to cut off the flow of liquid in the pipe 72. In order to provide means for accurately stopping the flow of liquid, means is provided for closing the main valve 522, but maintaining the dribble valve 534 in open position until the total amount of gasoline has been dispensed. This means comprises the pin 188 (Figure 3) properly located on the dial so that when only one or two cents (1¢ or 2¢) worth of liquid remains to be dispensed, said pin engages the member 194, rotating said member in a clockwise direction about the pivot 196 as viewed in Figures 3 and 19. Rotation of said member causes the cam portion 472 to engage the projection 474 of the pawl 436 to raise the pawl 436 out of engagement with the cam 428 (Figure 8). The spring 506 (Figure 17) moves said cam 426 through the arm 500, the bell crank 486, the rod 480, and the arm 476. The shaft 290 will move a predetermined amount until the plate 362 (Figures 14 and 15) engages the flange 368 of the member 354. In this position, the valve shaft 493 will have been moved a sufficient amount to close the main valve 522, as shown in Figure 23, but the dribble valve 534, as shown in said figure, will remain open.

Figure 14:
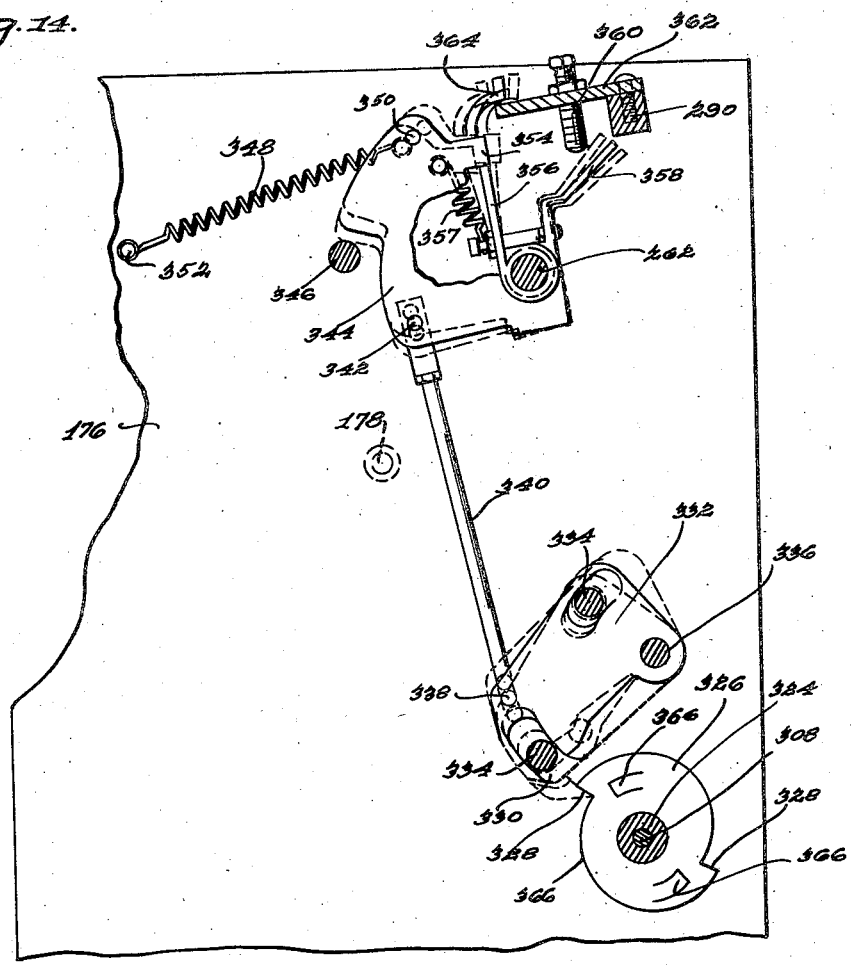
Figure 14 is a fragmentary sectional elevation of a portion of the valve control mechanism, the same being taken substantially in the plane as indicated by the line 14—14 of Figure 10.
Figure 22:
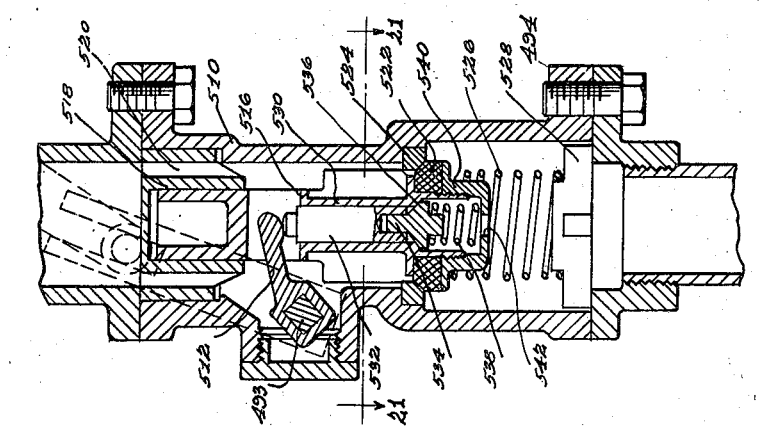
Figure 22 is an enlarged fragmentary sectional elevation showing the main valve and dribble valve in fully closed position.

When the plate 362 has been moved to the full line position shown in Figure 14, it will be seen that the stud 360 has moved away from its dotted line position against the arm 358. The member 356 will have moved to its full line position as it follows the flange 354 of the member 344 by action of the spring 357. Counterclockwise movement of the member 344 by the spring 348 causes downward movement of the rod 340 to a position where the member 330 of the cam lever 332 is in engagement with the cam 326. Movement of the cam 326, by virtue of the operation of the mechanism as already described, to the position where one of the shoulders 328 is in a position where the member 330 will drop off said shoulder permits downward movement of the cam lever 332 by the spring 348. This downward movement of the cam lever permits the spring 348 to move the member 344 in a still further counterclockwise direction until it abuts the stop 346, causing the flange 354 to disengage the plate 362. This final disengagement of the member 364 from the plate 362 permits the spring 506 (Figure 17) to move the valve shaft 493 to its final position as illustrated in Figure 22, where the dribble valve has been closed and the device is inoperative. In this position, of course it is understood that the dial has been moved to its zero position, showing that the total amount of liquid selected has been dispensed. The operation of the device can then be repeated, as above described, for additional dispensing operations.

With this mechanism, if the preselector is at its zero position, it is impossible to open the valve to permit liquid to be dispensed. It will be seen that when the dial has moved to zero, the roller 188 has moved the member 194 in a clockwise direction, as viewed in Figure 3, to disengage the pawl 436 (Figures 8 and 19) from engagement with the shoulder 442 of the cam 428, and this remains disengaged until the dial has been moved to another than zero position. Therefore, should an operator attempt to open the valve by movement of the lever 434 to valve-open position, the cam 426 will be moved but the cam 428 will not be moved, as the pawl 436 is out of engagement with the shoulder 442, and thus the valve cannot be opened.

Also, it is impossible to hold the valve open during dispensing operation and after the dial has reached zero. It will be seen that if an operator attempts to do this by holding the valve operating member 434 in valve-open position, he cannot do so as the cam 426 will have moved to valve-closed position when the dial reaches zero, because the roller 188 will have depressed the member 194 so that the cam 472 will have disconnected the pawl 436 from the shoulder 442 when said dial reaches zero. It will be noted further that in valve closed position there is a predetermined space 443 (Figure 9) between the end of the pawl 436 and the shoulder 442. This space is provided so that in moving the valve toward closed position, the valve will not be opened even a small amount until the subtracting pawl 252 is in engagement with the subtracting ratchet 198.

Assuming that a selection has been made in the liquid dispensing apparatus, and that the valve is moved to open position, wherein the clutch members 224 and 218 are in declutched position and the pawl 252 is in engagement with the subtracting ratchet, and the interlock on the coin slide is operative to prevent the insertion of additional coins, it is impossible to change the relative positions or conditions of these members without opening the motor switch or, in other words, without stopping the flow of liquid through the pump, in which case the liquid dispensing apparatus is inoperative.

*Token or coin dispensing means (Figure 34)*

Figure 34:
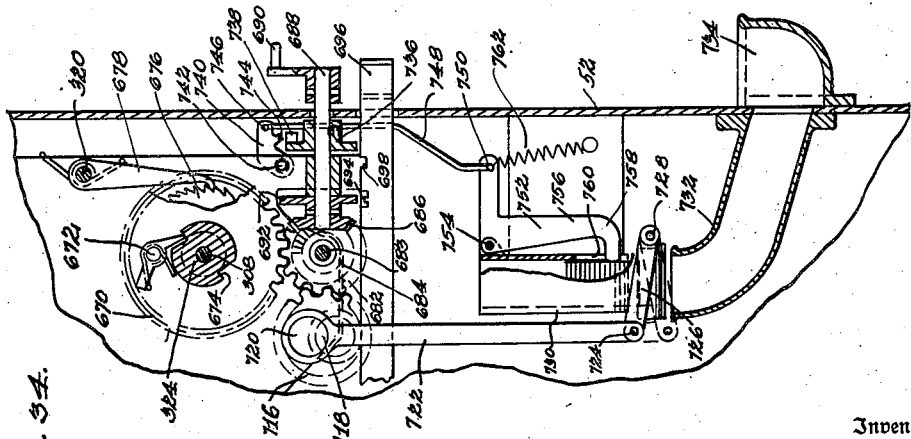
Figure 34 is a fragmentary sectional elevation corresponding to Figure 30 showing a modification of the coin or token return mechanism.

The token or coin dispensing mechanism illustrated in Figure 34 is a modification of that shown in Figures 30 to 33 inclusive, corresponding parts having been similarly numbered, and it will be understood that the operation is the same except as hereinafter noted. In this modification the shaft 688 is provided with the collar 736 provided with the cam lug 738. The locking lever 740 is pivotally mounted as at 742 adjacent said collar, and is provided with the locking shoulder or projection 744. The lever 740 is pivotally connected as at 746 to the rod 748, the opposite end of said rod being pivoted as at 750 to the bell crank 752.

The bell crank 752 is pivoted as at 754 adjacent the coin reservoir 730 and is provided with the depending arm 756 having an extension 758 projecting in the slot 760 provided in the coin reservoir, said projection being adapted to engage the coin or tokens in the reservoir whereby when said coins are in said reservoir the projection 758 is kept from entering the slot further so that the shoulder 744 is in an unobstructed position with respect to the cam lug 738. The bell crank may be urged in a clockwise direction by means of the light spring 762, or the weight of the parts may be depended upon for this movement.

Thus, when the coin level in the coin reservoir 730 is below the projection 758, the bell crank will be urged or will move in a clockwise direction, whereupon the locking shoulder 744 is disposed in the path of movement of the cam 738, preventing rotation of the shaft 688 by the handle 690. Therefore, unless the selected amount of liquid has been dispensed, the dial of the liquid dispensing apparatus cannot be returned to zero, and the pump is locked at this point as the shaft 688 cannot be rotated to zeroize the dial, as this can be done only if tokens or coins are returned. In this position, of course, it is impossible to insert the additional coins in the coin slides 596, as has already been explained, and the liquid dispensing apparatus is inoperative until an authorized person has again filled the coin or token reservoir 730, at which time, if there is an amount remaining on the dial, the shaft 688 can be rotated as the lug 744 is out of the path of movement of the cam 738 to dispense the proper change and to return the preselector mechanism to zero.

*Preselector dial modification (Figures 35 and 36)*

Figure 36:
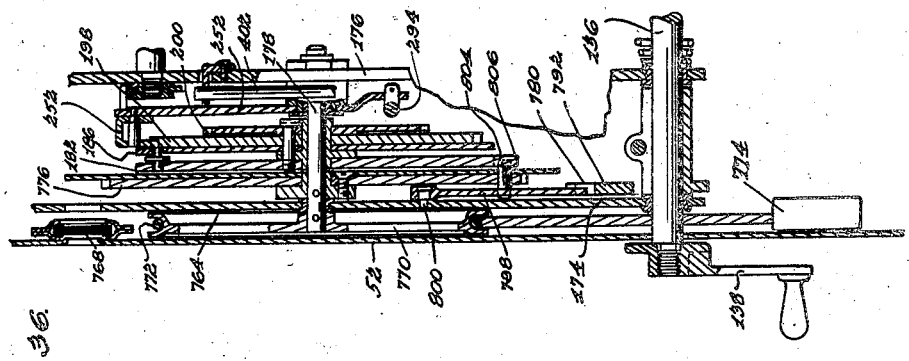
Figure 36 is a fragmentary sectional elevation corresponding substantially to Figure 4, the same being taken substantially in the plane as indicated by the line 36—36 of Figure 35.
Figure 35:
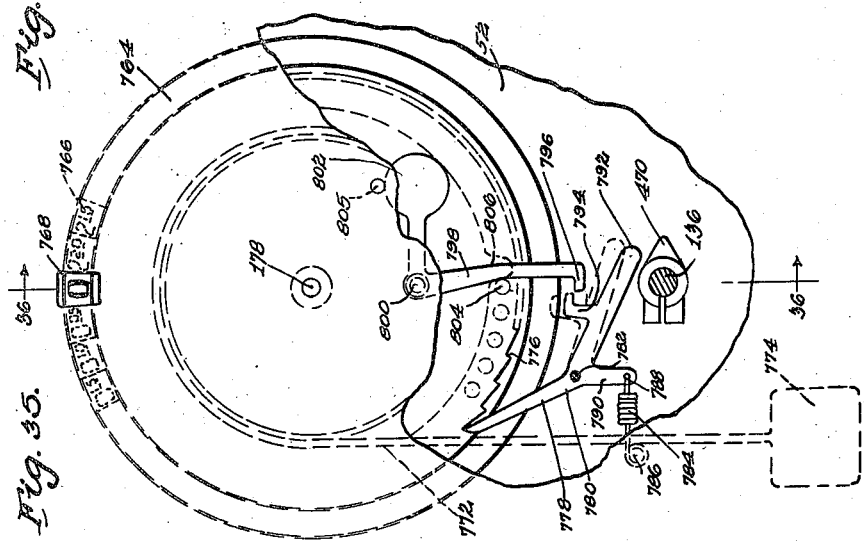
Figure 35 is a fragmentary elevation showing a modified form of dial arrangement for the coin preselector mechanism wherein the dial retains its original setting until the register has been returned to a predetermined or zero position.

In the modification illustrated in Figures 35 and 36, either of two embodiments is contemplated. One, where the dial 180, such as shown in Figure 3, is used in conjunction with the dial 764, in which case the dial 764 is rotatably mounted on the shaft 178 and is rotated with the dial 180 to the selected amount and remains at the set amount while the dial 180 is operating in a subtracting direction. Another, wherein the dial 764 is used in place of the dial 180. For the purposes of this description, the mechanism in the latter modification will be described in detail, as it will be apparent how the other modification is effected.

In this modification, the dial 768 is fixed to the shaft 178, the dial being provided with the row of numerals 766 corresponding to those shown in Figure 3, but in this case the window 768 is shown above the shaft 178 rather than in the place of the window 668. The dial is provided with the drum 770 to which one end of the cable 772 is fastened, the other end of said cable being provided with the counterweight 774 urging the dial and drum to a position where zero appears in the window 768. The dial is provided with the ratchet 776, said ratchet being adapted to be engaged by the locking leg 778 of the lever 780, said lever being pivoted adjacent said dial as at 782, the spring 784 being conveniently fixed at one end as at 786 to the support 174, the other end being secured as at 788 to the depending leg 790 of the lever 780.

The lever 780 is providing with the release arm 792 extending toward and being disposed adjacent the reset shaft 136, and being adapted to be abutted and moved by the lug 470 on said reset shaft. The arm 792 is provided with the locking member 794 engageable by the locking shoulder 796 of the bell crank 798. The bell crank 798 is pivoted as at 800 to the fixed support 174, and said bell crank is provided with the counterweight 802 urging said bell crank to a position where the shoulder 796 will engage the member 794. The members 250, 200, 198, 186 and 182 are rotatably mounted on the shaft 178, and operate in a manner as already described, and the member 776 is provided with the pin 804 projecting outwardly and adapted to contact the depending leg of the bell crank 798 to release the member 796 from locking engagement with the member 794 when the numeral zero appears in the window 768, counterclockwise movement of said bell crank being limited by the stop 805.

The pin 804 projects inwardly and is adapted to be engaged by the lug 806 provided on the member 182 whereby the dial is moved to its position to show the amount of the coin inserted by the mechanism already described, but will remain in that position by engagement between the leg 778 and the ratchet 776 while liquid is being dispensed, as the lug 806 will move away from the pin 804, or in a counterclockwise direction as viewed in Figure 35 during subtracting operation of the subtracting ratchet as the liquid is being dispensed.

Where the dial 764 is used with the dial 186, a ratchet and pawl arrangement similar to that shown in Figure 35 is provided so that the dial 764 travels with the dial 186 while it is being set, but remains in its position indicating the total number of coins inserted in the coin chutes 596 until the register is zeroized by rotation of the shaft 136, when the cam 470 will release the pawl to permit the dial 764 to return to zero.

There is an additional use for which the apparatus described herein may be employed, and that is, the source of liquid supply for the liquid dispensing apparatus may be locked and the key retained by the oil company. The oil company's representative will also have the key to the coin box 638. Therefore, the oil company can keep the source of liquid supply as it pleases. The service station operator can start in business with a small amount of money or tokens, and can progressively dispense liquid as he receives the money for it. If tokens are used, a relatively large value will be set up on the dial, as it is then supposed that a number of customers will purchase the liquid, and in this way it does not make any difference whether or not the machine is slugged, for if a slug is found in the machine the operator is responsible to the oil company. This then provides a bookkeeping system.

An additional modification contemplates the addition of switch operating mechanism, such as shown in Figure 44 of application Serial No. 309,502, filed December 15, 1939, wherein, when the selected amount has been dispensed, the switch is opened to render the pump inoperative, also the pump is similarly rendered inoperative when the coin return mechanism is operative.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is:

1. In combination, registering mechanism having cost registering means, said registering mechanism being adapted to be operated by operating means, preselector means having an indicating dial provided with indicia for visibly indicating the setting of said preselector means, subtracting mechanism operating on the indicating dial for returning the dial to zero position, connections between the cost registering means and said subtracting mechanism whereby the latter is actuated, setting means for said indicating dial including coin receiving mechanism having a movable member, connecting means between said movable member and the indicating dial so constructed and arranged that a predetermined movement of said movable member causes a related movement of said indicating dial, said connecting means including a clutch, control means having an open and a closed position, operative connections between said control means and clutch so constructed and arranged that when said control means is in open position said clutch is open and when said control means is in closed position said clutch is closed, and means on the indicating dial operating to condition said control means when said indicating dial is returned to a predetermined position.

2. A device as defined by claim 1 additionally including resetting mechanism for said cost registering means, and wherein means are provided for operation by the resetting mechanism for disconnecting the subtracting mechanism from the cost registering means whereby the indicating dial is not rotated to zero position by operation of the resetting mechanism to zeroize the said cost registering means.

3. In a device of the character described, the combination with a liquid flow line and a meter for measuring the liquid flowing through the line, of registering means operated by said meter and including cost indicating means, preselector mechanism spaced from said registering means and having a rotatable indicating dial adapted to be set to a selected figure above zero, a cost cam shaft provided by the preselector mechanism and having a coupling connection with the cost indicating means of said registering means, an overrunning clutch interposed between the cost cam shaft and the coupling connection, a reset shaft connected to the registering means and being journalled by the preselector mechanism, said reset shaft upon rotation thereof functioning to zeroize the registering means, subtracting mechanism for the indicating dial having operative connection with the cost cam shaft so that the rotation of said cost cam shaft will so actuate the subtracting mechanism to index the indicating dial toward zero position, and means actuated by rotation of the reset shaft for opening said clutch to disconnect the cost cam shaft from the said coupling connection, whereby the indicating dial is not rotated to zero position by rotation of the reset shaft to zeroize the registering means.

4. In a device of the character described, the combination with a liquid flow line and a meter for measuring the liquid flowing through the line, registering means operated by said meter and including cost indicating means, preselector mechanism spaced from said registering means and having a rotatable indicating dial adapted to be set to a selected figure above zero, a cost cam shaft provided by the preselector mechanism, a coupling connection joining the cost cam shaft with the cost indicating means of said registering means, an overrunning clutch interposed between the cost cam shaft and the coupling connection, a reset shaft connected to the registering means and being journalled by the preselector mechanism, subtracting mechanism for the indicating dial, connections between the subtracting mechanism and the cost cam shaft whereby the shaft upon rotation thereof will actuate the subtracting mechanism to index the dial toward zero position, and clutch disconnecting means extending from the reset shaft to said overrunning clutch, said means being operable upon rotation of the reset shaft to disconnect the cost cam shaft from the said coupling connection, whereby the indicating dial is not rotated to zero position by rotation of the reset shaft to zeroize the registering means.

5. In a device of the character described, the combination with a liquid flow line and a meter for measuring the liquid flowing through the line, of registering means operated by said meter and including cost indicating means, preselector mechanism spaced from said registering means and having a rotatable indicating dial adapted to be set to a selected figure above zero, a cost cam shaft provided by the preselector mechanism and having a coupling connection with the cost indicating means of said registering means, an overrunning clutch interposed between the cost cam shaft and the coupling connection, a reset shaft connected to the registering means and being journalled by the preselector mechanism, said reset shaft upon rotation thereof functioning to zeroize the registering means, subtracting mechanism for the indicating dial having operative connections with the cost cam shaft so that rotation of said cam shaft will actuate the subtracting mechanism to index the indicating dial toward zero position, means actuated by rotation of the reset shaft for opening said clutch to disconnect the cost cam shaft from the said coupling connection, whereby the indicating dial is not rotated to zero position by rotation of the reset shaft to zeroize the registering means, a coin reservoir, means including a coin return shaft adapted to be manually actuated for dispensing coins from said reservoir, and means connecting the coin return shaft with said cost cam shaft whereby actuation of the coin return shaft to deliver coins will rotate the cost cam shaft and operate the subtracting mechanism to synchronously index the indicating dial to zero position.

6. In a device of the character described, the combination of a liquid flow line and a meter for measuring the liquid flowing through the line, of registering means operated by said meter and including cost indicating means, preselector mechanism including a cost cam shaft and a rotatable indicating dial adapted to be set to a selected figure above zero, a coupling connection joining the cost cam shaft with the cost indicating means of said registering means, subtracting mechanism operating on the indicating dial for returning the indicating dial to zero position, said mechanism having operative connection with the cost cam shaft, a coin reservoir, means including a coin return shaft for dispensing coins from said reservoir, pawl and ratchet means connecting the coin return shaft with the cost cam shaft in a manner whereby rotation of the coin return shaft to deliver coins will rotate the cost cam shaft, and an overrunning clutch interposed between the cost cam shaft and the coupling connection therefor, whereby said cost cam shaft may be rotated by either the coupling connection or the coin return shaft independently of the other.

7. In a device of the character described, the combination of a liquid flow line and a meter for measuring the liquid flowing through the line, of registering means operated by said meter and including cost indicating means, preselector mechanism including a cost cam shaft and a rotatable indicating dial adapted to be set to a selected figure above zero, a coupling connection joining the cost cam shaft with the cost indicating means of said registering means, subtracting mechanism operating on the indicating dial for returning the indicating dial to zero position, connections between the subtracting mechanism and the cost cam shaft for actuating the mechanism upon rotation of said shaft, a coin reservoir, means including a coin return shaft for dispensing coins from said reservoir, pawl and ratchet means connecting the coin return shaft with the cost cam shaft in a manner whereby rotation of the coin return shaft to deliver coins will rotate the cost cam shaft, an overrunning clutch interposed between the cost cam shaft and the coupling connection therefor, whereby said cost cam shaft may be rotated by either the coupling connection or the coin return shaft independently of the other, and stop means provided by the preselector mechanism for preventing return rotation of the indicating dial beyond zero position.

8. In a device of the character described, the combination of a liquid flow line and a meter for measuring the liquid flowing through the line, of registering means operated by said meter and including cost indicating means, a valve in the flow line for controlling the flow of liquid, preselector mechanism including a cost cam shaft and a rotatable indicating dial adapted to be set to a selected figure above zero, a coupling connection joining the cost cam shaft with the cost indicating means of said registering means, subtracting mechanism operating on the indicating dial for returning the indicating dial to zero position, connections between the subtracting mechanism and the cost cam shaft for actuating the mechanism upon rotation of said shaft, control means for the valve having a valve open and a valve closed position, a member on the indicating dial having operation just before the dial reaches zero position to condition the control means whereby the valve is free to close when the dial reaches zero position, a reset shaft connected to the registering means and being journalled by the preselector mechanism, said reset shaft upon rotation thereof functioning to zeroize the registering means, and latching means operatively associated with the said control means and adapted to be actuated by rotation of the reset shaft, said latching means receiving actuation from the reset shaft in the event the control means is in valve open position to cause the control means to move to valve closed position.

9. In preselector mechanism, the combination with a rotatable indicating dial adapted to be set to a selected figure above zero, of a rotatable cam shaft having cams thereon, subtracting mechanism for returning the indicating dial to zero position, said subtracting mechanism having an operative and an inoperative position with respect to the indicating dial, connections between the subtracting mechanism and the cams whereby said cam shaft upon rotation thereof will actuate the subtracting mechanism to index the dial toward zero position provided the mechanism is operatively positioned, a coin reservoir, means including a coin return shaft for dispensing coins from said reservoir, connections between the coin return shaft and said cam shaft for rotating the cam shaft upon rotation of the coin return shaft to deliver coins, a locking bar for normally preventing rotation of the coin return shaft but having a coin dispensing position in which position said shaft may be rotated, and means actuated by the locking bar as a result of movement of the bar to coin dispensing position for rendering the subtracting mechanism operative.

10. In preselector mechanism, the combination with a rotatable indicating dial adapted to be set to a selected figure above zero, of a rotatable cam shaft having cams thereon, subtracting mechanism for returning the indicating dial to zero position, said subtracting mechanism having an operative and an inoperative position with respect to the indicating dial, connections between the subtracting mechanism and the cams whereby said cam shaft upon rotation thereof will actuate the subtracting mechanism to index the dial toward zero position provided the mechanism is operatively positioned, a coin reservoir, means including a coin return shaft for dispensing coins from said reservoir, connections between the coin return shaft and said cam shaft for rotating the cam shaft upon rotation of the coin return shaft to deliver coins, a locking bar for normally preventing rotation of the coin return shaft but having a coin dispensing position in which position said shaft may be rotated, and means connecting with the locking bar and terminating adjacent the subtracting mechanism, said means having movement as a result of movement of the locking bar to coin dispensing position to condition the subtracting mechanism to render the same operative.

11. In preselector mechanism, the combination with a rotatable indicating dial adapted to be set to a selected figure above zero, of a rotatable cam shaft having cams thereon, subtracting mechanism for returning the indicating dial to zero position, said subtracting mechanism having an operative and inoperative position with respect to the indicating dial, connections between the subtracting mechanism and the cams whereby said cam shaft upon rotation thereof will actuate the subtracting mechanism to index the dial toward zero position provided the mechanism is operatively positioned, a coin reservoir means including a coin return shaft for dispensing coins from said coin reservoir, connections between the coin return shaft and said cam shaft for rotating the cam shaft upon rotation of the coin return shaft to deliver coins, a locking bar for normally preventing rotation of the coin return shaft but having a coin dispensing position in which position said shaft may be rotated, coin receiving means including at least one movable slide, and means actuated by the locking bar as a result of movement of the bar to coin dispensing position, said means upon said actuation thereof conditioning the subtracting mechansm to render the same operative and also locking the movable slide of the coin receiving means to prevent the insertion of coins.

12. In preselector mechanism, the combination with a rotatable indicating dial adapted to be set to a selected figure above zero, of a rotatable cam shaft having cams thereon, subtracting mechanism for returning the indicating dial to zero position, said subtracting mechanism having an operative and inoperative position with respect to the indicating dial, connections between the subtracting mechanisms and the cams whereby said cam shaft upon rotation thereof will actuate the subtracting mechanism to index the dial toward zero position provided the mechanism is operatively positioned, a coin reservoir, means including a coin return shaft for dispensing coins from said reservoir, connections between the coin return shaft and said cam shaft for rotating the cam shaft upon rotation of the coin return shaft to deliver coins, a locking bar for normally preventing rotation of the coin return shaft but having a coin dispensing position in which position said shaft may be rotated, coin receiving means including a plurality of slides for coins of different denomination, a movable member adapted to have movement to an extent proportional to the denomination of the coins received by the slides, connecting means between the movable member and the indicating dial, said connecting means including a clutch, and means actuated by the locking bar as a result of movement of the bar to coin dispensing position, said means upon said actuation thereof respectively conditioning the subtracting mechanism to render the same operative, opening the clutch to disconnect the movable member from the indicating dial, and locking the movable slides of the coin receiving means to prevent insertion of coins.

13. In preselector mechanism, the combination with a rotatable indicating dial adapted to be set to a selected figure above zero, of a rotatable cam shaft, subtracting mechanism for returning the indicating dial to zero position, said mechanism having an operative and an inoperative position with respect to the dial, connections between the subtracting mechanism and the cam shaft whereby rotation of said shaft actuates the mechanism to return the dial to zero provided the mechanism is operatively positioned, a valve control shaft having a valve open and a valve closed position, and means actuated by movement of the control shaft to valve open position for moving the subtracting mechanism into contact with the indicating dial to thereby render the same operative.

14. In preselector mechanism, the combination with a rotatable indicating dial adapted to be set to a selected figure above zero, of a rotatable cam shaft, subtracting mechanism for returning the indicating dial to zero position, said mechanism having an operative and an inoperative position with respect to the dial, connections between the subtracting mechanism and the cam shaft whereby rotation of said shaft actuates the mechanism to return the dial to zero provided the mechanism is operatively positioned, a valve control shaft having a valve open and a valve closed position, resilient means yieldingly holding the valve control shaft in closed position, a lever for latching the control shaft in an open position against the tension of said resilient means, means actuated by movement of the control shaft to valve open position for conditioning the subtracting mechanism to thereby render the same operative, a reset shaft journaled for rotation, and a cam on said reset shaft adapted to have camming action with the lever to move the lever from a latching to a released position, whereby the control shaft is released upon camming of the latching lever.

15. In preselector mechanism, the combination with a rotatable indicating dial adapted to be set to a selected figure above zero, of a rotatable cam shaft, subtracting mechanism for returning the indicating dial to zero position, said mechanism having an operative and an inoperative position with respect to the dial, connections between the subtracting mechanism and the cam shaft whereby rotation of said shaft actuates the mechanism to return the dial to zero provided the mechanism is operatively positioned, a valve control shaft having a valve open and a valve closed position, an oscillatable member adapted to be actuated by movement of the control shaft to valve open position, said member upon actuation thereof conditioning the subtracting mechanism to thereby render the same operative, a coin reservoir, means including a coin return shaft for dispensing coins from said reservoir, a locking bar for normally preventing rotation of the coin return shaft but having a coin dispensing position in which position said shaft may be rotated, and means operatively connecting the locking bar with said oscillatable member in a manner whereby the member is independently actuated by the locking bar upon movement of the bar to coin dispensing position.

16. In preselector mechanism, the combination with a rotatable indicating dial adapted to be set to a selected figure above zero, of a rotatable cam shaft, subtracting mechanism operating on the dial and having connection with the cam shaft whereby rotation of said shaft actuates the mechanism to return the indicating dial to zero position, a coin reservoir, means including a coin return shaft for dispensing coins from said reservoir, connections between the coin return shaft and said cam shaft for rotating the cam shaft upon rotation of the coin return shaft to deliver coins, a locking bar for normally preventing rotation of the coin return shaft but having a coin dispensing position in which position said shaft may be rotated, a valve control shaft having a valve open and a valve closed position, and means actuated by the locking bar as a result of movement of the bar to coin dispensing position for locking the control shaft in valve closed position.

17. In preselector mechanism, the combination with a rotatable indicating dial adapted to be set to a selected figure above zero, of a rotatable cam shaft, subtracting mechanism operating on the dial and having connection with the cam shaft whereby rotation of said shaft actuates the mechanism to return the indicating dial to zero position, a coin reservoir, means including a coin return shaft for dispensing coins from said reservoir, connections between the coin return shaft and said cam shaft for rotating the cam shaft upon rotation of the coin return shaft to deliver coins, a locking bar for normally preventing rotation of the coin return shaft but having a coin dispensing position in which position said shaft may be rotated, a valve control shaft having a valve open and a valve closed position, a cam on said control shaft, a lever adapted to have latching relation with said cam when the control shaft is in closed position, and connections between the lever and the locking bar constructed and arranged so that the bar upon movement to coin dispensing position will move the lever into latching relation with the said cam.

18. In preselector mechanism, the combination with a rotatable indicating dial adapted to be set to a selected figure above zero, of a rotatable cam shaft, subtracting mechanism for returning the dial to zero position having connection with the cam shaft whereby rotation of said shaft actuates the mechanism, a valve control shaft having a valve open and a valve closed position, a cam fixed to said valve control shaft, a pawl carried by the cam, a second cam mounted on the valve control shaft for rotation independently thereof, said pawl adapted to have locking relation with the second cam in a manner whereby rotation of the control shaft from closed to open position will rotate the second cam in a similar direction and to the same extent, and means actuated by the indicating dial in advance of the dial reaching zero for camming the pawl to release its locking relation with the second cam, whereby said second cam is free to return to valve closed position independently of the control shaft.

19. Preselector mechanism as claimed in claim 18 wherein the second cam also has a valve open and a valve closed position, and resilient means yieldingly urging the second cam into valve closed position.

20. In preselector mechanism, the combination with a rotatable indicating dial adapted to be set to a selected figure above zero, of a rotatable cam shaft, subtracting mechanism or returning the dial to zero position having connection with the cam shaft whereby rotation of said shaft actuates the mechanism, a valve control shaft having a valve open and a valve closed position, a cam fixed to said valve control shaft, a pawl carried by the cam, a second cam mounted on the valve control shaft for rotation independently thereof, said pawl adapted to have locking relation with the second cam in a manner whereby rotation of the control shaft from closed to open position will rotate the second cam in a similar direction and to the same extent, a member having associated relation with the pawl and operative upon actuation to cam the pawl to release position, whereby the second cam is free to return to valve closed position independently of the control shaft, and means on the indicating dial positioned to actuate the member in advance of the dial reaching zero.

21. Preselector mechanism as claimed in claim 20 wherein the means on the indicating dial retains contact with said member while the dial is in zero position to thereby hold the pawl released.

22. In preselector mechanism, in combination, a rotatable indicating dial adapted to be moved to a figure above zero to thereby indicate the setting of the preselector mechanism, a cam shaft journalled by said mechanism, coin receiving means, connections operatively connecting the indicating dial with the coin receiving means and operating to move the dial to a figure equal to the value of the coins received thereby, subtracting mechanism operating on the indicating dial for returning the dial to zero, connections between the subtracting mechanism and said cam shaft whereby rotation of the shaft will actuate the subtracting mechanism, valve control means having a valve open and a valve closed position, latching means for holding the valve control means in open position, and a member on the indicating dial having location immediately in advance of zero for releasing said latching means to thereby permit the valve control means to move to a valve closed position.

23. In preselector mechanism, in combination, a rotatable indicating dial adapted to be moved to a figure above zero, a rotatable cam shaft, coin receiving means operatively connecting with said indicating dial and having operation to move the dial to a figure equal to the value of the coins received thereby, subtracting mechanism for the dial having connection with the cam shaft whereby rotation of said shaft will actuate the mechanism to return the indicating dial to zero position, a coin reservoir, means including a coin return shaft for dispensing coins from the reservoir upon actuation thereof, connections between the coin return shaft and said cam shaft for rotating the cam shaft upon rotation of the coin return shaft to deliver coins, a locking bar for normally preventing rotation of the coin return shaft but having a coin dispensing position in which position said shaft may be rotated, a valve control shaft having a valve open and a valve closed position, and means preventing movement of the locking bar to a coin dispensing position when the valve control shaft is in open position.

24. In preselector mechanism, in combination, a rotatable indicating dial adapted to be moved to a figure above zero, a rotatable cam shaft, coin receiving means, connections operatively connecting the coin receiving means with said indicating dial, said connections including a clutch and said coin receiving means operating to move the dial to a figure equal to the value of the coins received thereby, subtracting mechanism operating on the dial for returning the dial to zero position, connections between the subtracting mechanism and the cam shaft, valve control means having an open and a closed position, and operative connections between the control means and the clutch so constructed and arranged that when said control means is in open position said clutch is open, and when said control means is in closed position the clutch is closed.

25. In preselector mechanism, in combination, a rotatable indicating dial adapted to be moved to a figure above zero, means for moving said dial including coin receiving means, connections operatively connecting the coin receiving means with the dial, said connections including a clutch and said coin receiving means operating to move the dial to a figure equal to the value of the coins received thereby, a coin reservoir, coin return means including a coin return shaft for dispensing coins from the reservoir upon rotation thereof, a locking bar normally preventing rotation of the coin return shaft but having a coin dispensing position in which position said shaft may be rotated, and means actuated by the locking bar as a result of movement of the bar to coin dispensing position for opening said clutch.

26. In preselector mechanism, in combination, a rotatable indicating dial adapted to be moved to a figure above zero, means for moving said dial including coin receiving means, connections operatively connecting the coin receiving means with the dial, said connections including a clutch and said coin receiving means including a movable member adapted to have movement to an extent proportional to the denomination of the coins received whereby the dial is moved to a figure equal to the value of the coins thus received, a member for locking the coin receiving means to prevent the insertion of coins, a coin reservoir, coin return means including a coin return shaft for dispensing coins from said reservoir, a locking bar for normally preventing rotation of the coin return shaft but having a coin dispensing position in which position said shaft may be rotated, and means actuated by the locking bar as a result of movement of the bar to coin dispensing position, said means upon said actuation thereof opening the clutch and moving the member into locking relation with the coin receiving means.

SHERWOOD HINDS.